United States Patent
Patel et al.

(10) Patent No.: US 11,898,084 B2
(45) Date of Patent: Feb. 13, 2024

(54) SUSPENSION SUPPORTING ADDITIVE FOR WATER-BASED DRILLING AND COMPLETIONS FLUIDS

(71) Applicant: Saudi Arabian Oil Company, Dhahran (SA)

(72) Inventors: Hasmukh Patel, Houston, TX (US); Ashok Santra, Houston, TX (US); Carl Thaemlitz, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 344 days.

(21) Appl. No.: 17/410,119

(22) Filed: Aug. 24, 2021

(65) Prior Publication Data

US 2021/0395596 A1 Dec. 23, 2021

Related U.S. Application Data

(63) Continuation-in-part of application No. 16/801,528, filed on Feb. 26, 2020, now Pat. No. 11,414,584.
(Continued)

(51) Int. Cl.
*C09K 8/16* (2006.01)
*E21B 21/00* (2006.01)
(Continued)

(52) U.S. Cl.
CPC ............... *C09K 8/16* (2013.01); *C09K 8/206* (2013.01); *C09K 8/24* (2013.01); *E21B 21/00* (2013.01)

(58) Field of Classification Search
None
See application file for complete search history.

(56) References Cited

U.S. PATENT DOCUMENTS 4,312,765 A 1/1982 Block
4,363,736 A 12/1982 Block
(Continued)

FOREIGN PATENT DOCUMENTS

CN 101560686 A 10/2009
CN 102041368 A 5/2011
(Continued)

OTHER PUBLICATIONS

Bocchini et al., "One-pot Synthesis of Hexadecyl Modified Layered Magnesium Silicate and Polyethylene Based Nanocomposite Preparation", Applied Clay Science 80-81 (2013) 320-325.
(Continued)

*Primary Examiner* — Jeffrey D Washville
(74) *Attorney, Agent, or Firm* — Bracewell LLP; Constance G. Rhebergen; Eleanor T. Porter

(57) ABSTRACT

Methods and compositions for modified well fluids. One method including combining an amount of a synthetic functionalized additive with an intermediate well fluid composition to form a synthetic functionalized additive-containing well fluid composition; the synthetic functionalized additive comprising a synthetic layered magnesium silicate that is covalently bonded to a functional group, and the intermediate well fluid composition comprising a water-based continuous phase with solid particles, wherein the synthetic functionalized additive increases suspension stability of the solid particles versus a well fluid composition comprising the solid particles without the synthetic functionalized additive.

23 Claims, 7 Drawing Sheets

Related U.S. Application Data which is a continuation-in-part of application No. 16/560,659, filed on Sep. 4, 2019, now Pat. No. 11,118,092.

(60) Provisional application No. 62/726,512, filed on Sep. 4, 2018.

(51) Int. Cl.
  *C09K 8/20* (2006.01)
  *C09K 8/24* (2006.01)

(56) References Cited

U.S. PATENT DOCUMENTS

| | | | |
|---|---|---|---|
| 4,770,894 | A | 9/1988 | Usui et al. |
| 4,830,843 | A | 5/1989 | Usui et al. |
| 6,475,959 | B1 | 11/2002 | Lange et al. |
| 6,737,384 | B2 | 5/2004 | Rayborn |
| 7,135,231 | B1 | 11/2006 | Sinclair |
| 7,449,164 | B2 | 11/2008 | Pinnavaia et al. |
| 7,591,313 | B2 | 9/2009 | Weaver et al. |
| 7,741,250 | B2 | 6/2010 | Patel et al. |
| 7,758,689 | B2 | 7/2010 | Li et al. |
| 8,074,715 | B2 | 12/2011 | Rispler et al. |
| 8,142,752 | B2 | 3/2012 | Kovanda et al. |
| 8,202,501 | B2 | 6/2012 | Martin et al. |
| 9,145,510 | B2 | 9/2015 | Crews et al. |
| 9,167,830 | B2 | 10/2015 | Combs et al. |
| 9,297,244 | B2 | 3/2016 | Mahoney et al. |
| 9,969,921 | B2 | 5/2018 | Wang et al. |
| 10,059,869 | B2 | 8/2018 | Singh et al. |
| 10,113,098 | B2 | 10/2018 | Galindo et al. |
| 10,196,553 | B2 | 2/2019 | Patil et al. |
| 2003/0096143 | A1 | 5/2003 | Lasmarias et al. |
| 2004/0108113 | A1* | 6/2004 | Luke .......... C09K 8/16 166/292 |
| 2006/0021945 | A1 | 2/2006 | Pinnavaia et al. |
| 2006/0201815 | A1 | 9/2006 | Separautzki et al. |
| 2009/0131280 | A1 | 5/2009 | Federici et al. |
| 2011/0180256 | A1 | 7/2011 | Tehrani et al. |
| 2012/0024659 | A1 | 2/2012 | Mizoro |
| 2013/0217603 | A1 | 8/2013 | Jamison et al. |
| 2013/0323507 | A1 | 12/2013 | Rudenko |
| 2014/0205528 | A1 | 7/2014 | Le Roux et al. |
| 2016/0186034 | A1 | 6/2016 | Mainye et al. |
| 2017/0137702 | A1 | 5/2017 | Khlestkin et al. |
| 2018/0037795 | A1 | 2/2018 | Goel et al. |
| 2019/0040296 | A1 | 2/2019 | Panamarathupalayam et al. |
| 2020/0190384 | A1 | 6/2020 | Patel et al. |

FOREIGN PATENT DOCUMENTS

| | | |
|---|---|---|
| CN | 104098930 A | 10/2014 |
| CN | 108505392 A | 9/2018 |
| WO | 2012043180 A1 | 4/2012 |
| WO | 2016183181 A1 | 11/2016 |
| WO | 2018101929 A1 | 6/2018 |

OTHER PUBLICATIONS

Burkett et al., "Synthesis, Characterization, and Reactivity of Layered Inorganic-Organic Nanocomposites Based on 2:1 Trioctahedral Phyllosilicates", Chemistry of Materials, 1997, pp. 1071-1073, American Chemical Society.
Chabrol et al., "Functionalization of synthetic talc-like phyllosilicates by alkoxyorganosilane grafting", 20 J. Mater. Chem. 9695-9706 (2010).
Claverie et al., "Synthetic Talc and Talc-like Structures: Preparation, Features and Applications", 24 Chem. Eur. J. 519-542 (2018).
Fonseca et al., "Aminated Phyllosilicates Synthesized via a Sol-Gel Process", Langmuir 1999, 15, 5048-5055.
Fonseca et al., "New Amino-Inorganic Hybrids From Talc Silylation and Copper Adsorption Properties", 36 Materials Research Bulletin 277-287 (2001).
Gallego et al., "Synthesis of New Lamellar Inorganic-Organic Talc-Like Hybrids", 32 New J. Chem. 407-412 (2008).
International Search Report and Written Opinion for related PCT application PCT/US2019/049459 dated Jan. 31, 2020. (SA5953PCT).
International Search Report and Written Opinion of PCT Application No. PCT/US2021/070199 (SA51271/ASC0411 CIP of SA5953/ASC0306) dated Jun. 18, 2021: pp. 1-12.
Lagadic, "Schiff base chelate-functionalized organoclays," Microporous and Mesoporous Materials, vol. 95(1-3), Oct. 18, 2006: pp. 226-233.
Moscofian et al., "Stability of layered aluminum and magnesium organosilicates", Microporous and Mesoporous Materials, 2008, pp. 113-120, Elsevier.
Moscofian et al., "Synthesized layered inorganic-organic magnesium organosilicate containing a disulfide moiety as a promising sorbent for cations removal", Journal of Hazardous Materials, 2008, pp. 63-69, Elsevier.
Moura et al., "Physico-chemical of organo-functionalized magnesium phyllosilicate prepared by microwave heating", Microporous and Mesoporous Materials, 2014, pp. 292-300, Elsevier.
Patel et al., "Synthetic Talc as a Solid Base Catalyst for Condensation of Aldehydes and Ketones", Journal of Molecular Catalysis A: Chemical 286 (2008) 31-40.
Patel, et al., "Covalently-Linked Organic Functionalities on Nano-Platelets as a Viscosifier for Oil-Based Muds", Society of Petroleum Engineers, SPE-193588-MS, 2019.
Patel, et al., "Organically modified layered magnesium silicates to improve rheology of reservoir drilling fluids", Nature, Scientific Reports, 2020.
Samayamutthirian Palaniandy et al., "Production of Talc Nanosheets via Fine Grinding and Sonication Processes", 6 J. Nuclear Tech. 255-265 (2009).
Sharma et al., "Synthesis of Jasminaldehyde Using Magnesium Organo Silicate as a Solid Base Catalyst", Journal of Molecular Catalysis A: Chemical 280 (2008) 61-67.
Silva et al., "Layered Inorganic-Organic Talc-like Nanocomposites", Chem. Mater. 2002, 14, 175-179.
Young-Chul Lee, Dual-end Functionalized Magnesium Organo-(phyllo)Silicates Via Co-Condensation and its Antimicrobial Activity, 83-84 Applied Clay Sci. 474-485 (2013).

\* cited by examiner

SUSPENSION SUPPORTING ADDITIVE FOR WATER-BASED DRILLING AND COMPLETIONS FLUIDS

RELATED APPLICATIONS

This application is a continuation-in-part of U.S. Nonprovisional patent application Ser. No. 16/801,528, which was filed on Feb. 26, 2020, which itself is a continuation-in-part of U.S. Nonprovisional patent application Ser. No. 16/560,659, which was filed on Sep. 4, 2019 and itself claims priority from U.S. Provisional Patent Application No. 62/726,512 filed on Sep. 4, 2018. For purposes of United States patent practice, this application incorporates the contents of the Provisional Patent Application and Nonprovisional Application by reference in their entirety.

TECHNICAL FIELD

Compositions and methods for use as fluid additives are disclosed. Specifically, compositions and methods are disclosed for enhancing rheological properties of drilling fluids for drilling boreholes or wells.

BACKGROUND

Organically modified smectitic materials, such as bentonite and other montmorillonites, and hectorites can be utilized as viscosifiers in drilling fluids. These materials are composed of layered inorganic materials, such as aluminosilicates and magnesium silicates. Organic modifiers, such as aliphatic and aromatic quaternary ammonium salts, in these viscosifiers are linked with ionic interaction on the surface of the layered inorganic materials, see FIG. 1. These weak interactions between organic moieties and the layered inorganic materials are susceptible to failure under extreme temperatures, such as temperatures up to 260 degrees Celsius (° C.), extreme pressures up to about 240 megapascals (MPa), shearing stresses, and repeated exposure to alkaline or acidic conditions.

The ionic interactions are indicated by plus signs and minus signs. As shown in FIG. 1, when the weak interactions fail the layers break apart A failure of the interaction between the organic moieties and the layered inorganic materials negates the intended effectiveness of the material in its application.

Additionally, traditional viscosifiers are primarily obtained from natural resources. As a result, the chemical composition of the viscosifiers changes from batch to batch. The changes from batch to batch require frequent optimization of drilling fluid formulations during the drilling operation.

SUMMARY

Compositions and methods for use as fluid additives are disclosed. Specifically, compositions and methods are disclosed for enhancing rheological properties of drilling fluids for drilling boreholes or wells.

A method of making a rheologically modified well fluid is disclosed. The method includes combining an amount of a synthetic functionalized additive with an intermediate well fluid composition to form a synthetic functionalized additive-containing well fluid composition; the synthetic functionalized additive having a synthetic layered magnesium silicate that is covalently bonded to a functional group, and the intermediate well fluid composition having a water-based continuous phase; and subjecting the synthetic functionalized additive-containing well fluid to shear stress for a period of time such that the synthetic functionalized additive-containing well fluid composition is rheologically modified to produce the rheologically modified well fluid. In at least one embodiment, the functional group that is covalently bonded to the synthetic layered magnesium silicate is selected from the group consisting of hydroxyl groups (—OH), amine groups, and combinations of the same.

In at least one embodiment, the intermediate well fluid composition further includes a polycation component and an anionic surfactant component. The polycation component can be partially hydrolyzed polyacrylamide. In at least one embodiment, the anionic surfactant component can be alkylbenzene sulfonate. In at least one embodiment, the anionic surfactant component can be sodium dodecylbenzene sulfonate.

In at least one embodiment, the period of time that the synthetic functionalized additive-containing well fluid composition is subjected to shear stress is in the range of 1-300 minutes. In at least one embodiment, the method also includes aging the reheologically modified well fluid at a pressure greater than atmospheric pressure and a temperature greater than 50° C. for a period of at least one hour. In at least one embodiment, the step of subjecting the synthetic functionalized additive-containing well fluid composition includes high-shear mixing the synthetic functionalized additive-containing well fluid composition.

A rheologically modified well fluid composition is disclosed. The composition includes a water-based fluid; and a synthetic magnesium silicate. The synthetic layered magnesium silicate includes: a first functionalized silicate layer, the first functionalized silicate layer having a tetrahedral silicate layer and a functional group; an octahedral brucite layer having magnesium oxide/hydroxide; a second functionalized silicate layer having the tetrahedral silicate layer and the functional group; and a functional group covalently bonded to the tetrahedral silicate layer of the first functionalized silicate layer and separately covalently bonded to the tetrahedral silicate layer of the second functionalized silicate layer. The octahedral brucite layer can be positioned between the first functionalized silicate layer and the second functionalized silicate layer. The functional group can extend from both the first functionalized silicate layer and the second functionalized silicate layer away from the octahedral brucite layer.

In at least one embodiment, the functional group can be selected from the group consisting of hydroxyl groups (—OH), amine groups, and combinations of the same. In at least one embodiment, the rheologically modified well fluid composition includes the synthetic layered magnesium silicate in the range of 0.1-25 weight per volume percent (w/v %). In at least one embodiment, the rheologically modified well fluid composition also includes a cationic component and an anionic surfactant component. The cationic component can be partially hydrolyzed polyacrylamide. In at least one embodiment, the anionic surfactant component can be alkylbenzene sulfonate. In at least one embodiment, the anionic surfactant component can be an alkylbenzene sulfonate. The alkylbenzene sulfonate can include a compound selected from the group consisting of sodium dodecylbenzene sulfonate, dodecyl sulfonate, and combinations of the same.

In at least one embodiment, the rheologically modified well fluid composition also includes a biopolymer selected from the group consisting of carboxymethyle cellulose, hydroxyethyle cellulose, guar gum, hydroxypropyl guar, xanthan gum, and combinations of the same. In at least one embodiment, the rheologically modified well fluid composition also includes a synthetic polymer selected from the group consisting of amine fatty acid copolymers, amide fatty acid copolymers, acrylates and acrylate copolymers, hydrolyzed polyacrylamide and their ionic salts, maleic anhydride and styrene copolymer based polymers, and combinations of the same.

A method of drilling a well in a subterranean formation is disclosed. The method includes supplying a rheologically modified well fluid to a drill string, the rheologically modified well fluid having a water-based fluid and a synthetic functionalized additive, the synthetic functionalized additive having a synthetic layered magnesium silicate that is covalently bonded to a functional group; and operating the drill string such that the rheologically modified well fluid is conducted to a bottom hole assembly having a drill bit, and such that the drill bit drills into the subterranean formation.

In at least one embodiment, the functional group that is covalently bonded to the synthetic layered magnesium silicate is selected from the group consisting of hydroxyl groups (—OH), amine groups, and combinations of the same. In at least one embodiment, the rheologically modified well fluid also includes a cationic component and an anionic surfactant component. The cationic component can be selected from the group consisting of partially hydrolyzed polyacrylamide, copolymers of acrylamide having cationic polymers, and combinations of the same. The anionic surfactant component can be selected from the group consisting of sodium dodecylbenzene sulfonate, alkylbenzene sulfonates, alkyl sulfonates, sodium salts of fatty acids, alkaline metal salts of fatty acids, alkaline earth metal salts of fatty acids, and combinations of the same.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
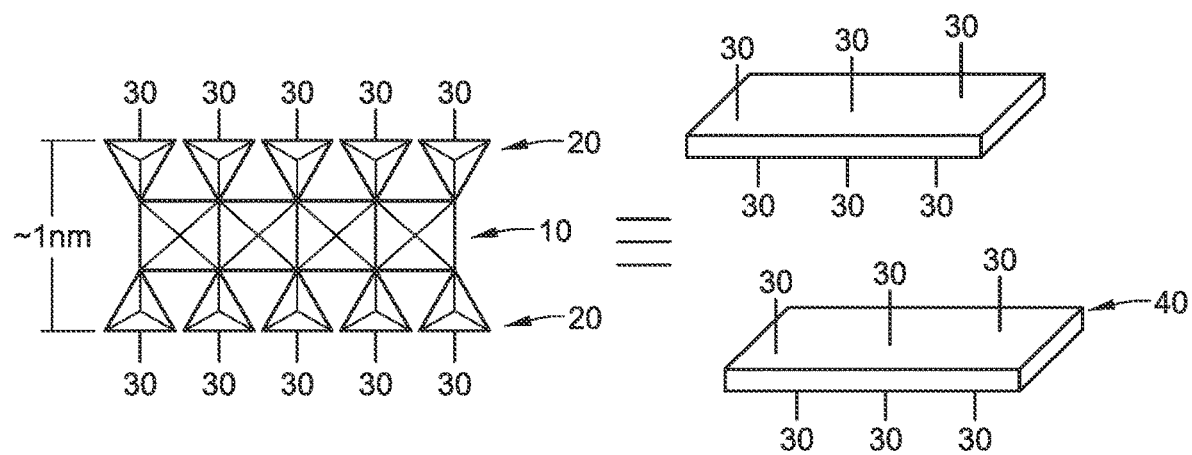
FIG. 1 provides a pictorial representation of a synthetic functionalized additive showing the synthetic layered magnesium silicate with covalently-linked organic functional groups.

In the accompanying figures, similar components or features, or both, may have a similar reference label.

DETAILED DESCRIPTION

While the scope of the composition and method will be described with several embodiments, it is understood that one of ordinary skill in the relevant art will appreciate that many examples, variations, and alterations to the composition and methods described here are within the scope and spirit of the disclosure.

Accordingly, the embodiments described are set forth without any loss of generality, and without imposing limitations on the disclosure. Those of ordinary skill in the relevant art understand that the scope includes all possible combinations and uses of particular features described in the specification.

The compositions and methods are directed to water-based rheologically modified well fluids having synthetic functionalized additives. The rheologically modified well fluids can be used as drilling fluids. The synthetic functionalized additives can include organic functional groups covalently bonded to synthetic layered magnesium silicate. The methods include making the rheologically modified well fluids and using the rheologically modified well fluids in drilling operations. The synthetic layered magnesium silicates are polycrystalline materials and not single crystals.

Advantageously, the synthetic functional additives contain strong covalent bonds between the organic functional groups and the synthetic layered magnesium silicate which reduce the effects of stresses on the bonds meaning more bonds remain intact during a treatment process. With more bonds remaining intact, the covalent bonds increase the effectiveness of the synthetic functional additives. Advantageously, the synthetic layered magnesium silicates can be reproduced resulting in consistent composition from batch to batch. Consistent and reproducible results is an advantage over naturally-derived materials, such as organoclays or organically modified layered materials, which are subject to the impurities in the natural source. Additionally, the synthesis can be manipulated to produce certain results in the product, such as changing the crystallinity. Advantageously, the synthetic layered magnesium silicates provide consistency for the duration of an application and reduce or eliminate the need to alter the formulation during use and application. Advantageously, the synthetic functional additives can be prepared in one-pot synthesis approaches reproducible at industrial scale. Advantageously, well fluids containing the synthetic functional additives exhibit rheologically independent behavior at pressures up to about 240 MPa and temperatures up to about 205° C., which is advantageous because having rheologically independent behavior means the well fluids maintain their properties, such as viscosity and thixotropy, in the face of an applied stress and changes to the temperature. Well fluids containing the synthetic functional additives are less susceptible to stresses than well fluids that do not exhibit rheologically independent behavior.

Moreover, well fluids having the synthetic functional additives can increase the yield point (that is, the amount of shear stress required to induce flow in well fluid at rest) or increase the low shear yield point as compared to well fluids that do not contain the synthetic functional additives; this too is an aspect of the rheologically independent behavior of well fluids having the synthetic functional additives. Without intending to be limited by theory, the yield point is representative of the attractive force between constituent particles of the well fluid and is a good indicator of the gel strength of the well fluid. Generally, the yield point indicates the ability of the well fluid to carry suspended cuttings. Advantageously, fluids containing the synthetic functional additives exhibit less change in viscosity due to variation in temperature as compared to the same fluids containing conventional rheology modifiers, such as organoclays. Advantageously, fluids containing the synthetic functional additives exhibit reductions in friction factor as compared to the same fluids containing conventional rheology modifiers, such as organoclays. Advantageously, the synthetic functional additives contain organophilic and hydrophilic functionalities.

As used throughout this disclosure, "brucite" refers to a magnesium oxide/hydroxide having monomeric formula $MgO(OH)_2$.

As used throughout this disclosure, "octahedral" refers to the crystal pattern defining an octahedron, with eight triangular faces, twelve straight edges, and six vertices.

As used throughout this disclosure, "tetrahedral" refers to the crystal pattern defining a tetrahedron, with four triangular faces, six straight edges, and four vertices.

As used throughout this disclosure, "silane" refers to a silicon compound containing at least three alkoxy groups (an alkyl group bonded to oxygen), where the fourth substituent includes a functional group and can be a fourth alkyoxy group or can be a carbon containing compound.

As used throughout this disclosure, "viscosifier," "viscosity modifier," and "rheological modifier" refer to compounds that change rheological properties when added to a fluid. Primarily, viscosifiers are used to increase the viscosity of a fluid.

As used throughout this disclosure, "thixotropic" refers to the tendency of a fluid or gel to exhibit a decrease in viscosity when a stress or a change in temperature is applied, such as mixing, shaking, shearing, or agitating. This property is time-dependent. Thixotropic control additives are additives that can minimize the decrease in viscosity of a fluid when a stress or a change in temperature is applied.

As used throughout this disclosure, "suspension additives" refers to additives that can reduce settling of solid particles in fluids or gels.

As used throughout this disclosure, "rheologically independent behavior" refers to a fluid where the changes in rheological properties, such as viscosity and thixotropy, experience less than 10 percent (%) change due to a variation in an applied stress. Stresses can include shear stress, temperature, and combinations of the same. For example, an applied stress can be a rate of mixing and a variation in that applied stress would occur when the rate the rate of mixing is being increased or decreased. An example of a fluid that exhibits rheologically independent behavior is a fluid that does not experience a change in viscosity due to a variation in the temperature. An example of rheologically independent behavior can be seen in FIG. 2, where the graph at 150° C. shows minimal change in the dial reading over an increase in rotational speed as measured in revolutions per minute (RPM).

As used throughout this disclosure, "talc" refers to a natural mineral composed of magnesium silicates formed naturally over thousands of years and is crystalline. Talc does not include organic functional groups.

The synthetic functionalized additive includes a synthetic layered magnesium silicate and a functional group. The synthetic layered magnesium silicate can have a thickness of about 1 nanometer (nm) and a lateral dimension in the range from 2 nanometers (nm) to 5 microns. The overall thickness of the synthetic functionalized additive can depend on the length of the functional groups.

The synthetic layered magnesium silicate includes a layer of octahedral brucite positioned between two functionalized silicate layers.

The layer of octahedral brucite can be synthesized as part of the process or can be obtained from other sources. The octahedral brucite layer can be synthesized by reacting a magnesium salt with an aqueous hydroxide. Any magnesium salt that can react with a hydroxide can be used. Examples of the magnesium salt can include magnesium chloride, magnesium chloride hydrates, magnesium nitrate, magnesium nitrate hydrates, magnesium bromide, magnesium bromide hexahydrate, and combinations of the same. Magnesium chloride hydrates have the chemical formula $MgCl_2(H_2O)_x$, where x is selected from 2, 4, 6, 8, and 12. Magnesium nitrate hydrates have the chemical formula $Mg(NO_3)_2(H_2O)_y$, where y is selected from 2 and 6. Other sources of octahedral brucite can include magnesium-rich bittern brine, a byproduct of sodium chloride production from sea water.

The aqueous hydroxide can include a hydroxide in water. The hydroxide can be present in an amount between 2 percent by weight (wt %) and 10 wt %, alternately between 2-8 wt %. The hydroxide can be any hydroxide that can react with a salt. Examples of the hydroxide include sodium hydroxide, potassium hydroxide, ammonium hydroxide, and combinations of the same.

Each of the functionalized silicate layers contains a tetrahedral silicate layer and a functional group. The functional groups are covalently bonded to the tetrahedral silicate layer. The functionalized silicate layers can be obtained by reacting the octahedral brucite with a silane. Any silane containing a functional group and capable of forming a tetrahedral layer can be used. The silanes can be available as an aqueous solution, a non-aqueous solution, or a liquid. Examples of silanes for use in the synthetic layered magnesium silicate include 3-(aminophenoxy)propyltriethoxysilane $[NH_2(C_6H_3O)C_3H_6Si(OC_2H_5)_3]$, N-(2-aminoethyl)-3-aminopropyltrimethoxysilane $[NH_2(C_2H_4NH)C_3H_6Si(OCH_3)_3]$, 11-aminoundecyltrimethoxysilane $[NH_2C_{11}H_{22}Si(OCH_3)_3]$, N-(6-aminohexyl)aminomethyltrimethoxysilane $[NH_2$

[$C_6H_{12}$NH)$CH_2$Si(OCH$_3$)$_3$], N-(2-aminoethyl)-11-aminoundecyltrimethoxysilane [NH$_2$($C_2$H$_4$NH)$C_{11}$H$_{22}$Si(OCH$_3$)$_3$], phenyltrimethoxysilane [$C_6$H$_5$Si(OCH$_3$)$_3$], trimethoxy(propyl)silane [CH$_3$CH$_2$CH$_2$Si(OCH$_3$)$_3$], trimethoxymethylsilane [CH$_3$Si(OCH$_3$)$_3$], hexadecyltrimethoxysilane [CH$_3$(CH$_2$)$_{15}$Si(OCH$_3$)$_3$], octyltriethoxysilane [CH$_3$(CH$_2$)$_7$Si(OCH$_3$)$_3$], tetraethyl orthosilicate [Si(OC$_2$H$_5$)$_4$], N-[3-(trimethoxysilyl)propyl]ethylenediamine [NH$_2$ (CH$_2$)NH(CH$_2$)$_3$Si(OCH$_3$)$_3$], (3-aminopropyl)triethoxysilane [NH$_2$(CH$_2$)$_3$Si(OCH$_3$)$_3$], silanes having the formula RSi(OR")$_3$, and combinations of the same. Where silanes have the formula RSi(OR")$_3$, R" can include a methyl group (—CH$_3$), an ethyl group (—C$_2$H$_5$), and combinations of the same; and R can include alkyl groups, aryl groups, and combinations of the same. Alkyl groups can include alkyl groups having saturated groups, alkyl groups having unsaturated groups, alkyl groups having functional substituents, and combinations of the same. Aryl groups can include aryl groups having saturated groups, aryl groups having unsaturated groups, aryl groups having functional substituents, and combinations of the same. The functional substituents can include amines, carboxylates, amides, acrylates, thiols, hydroxyls, isocyanates, methacrylates and combinations of the same. The functional substituents can be attached at the end of the chain, can be attached in-between, and combinations of the same. The functional substituents form functional groups of the silane. In at least one embodiment, the silanes for use in the synthetic layered magnesium silicate include 3-(aminophenoxy)propyltriethoxysilane, N-(2-aminoethyl)-3-aminopropyltrimethoxysilane, 11-aminoundecyltrimethoxysilane, N-(6-aminohexyl)aminomethyltrimethoxysilane, N-(2-aminoethyl)-11-aminoundecyltrimethoxysilane, and combinations of the same. In at least one embodiment, the silane has the formula RSi(OR")$_3$.

The silane can be selected based on the desired functional group. The functional groups can include hydroxyl groups (—OH), saturated alkyl groups having the formula (—CH$_2$(CH$_2$)$_x$CH$_3$), x is an integer between 0 and 18, phenyl groups, amine groups, diamine groups, carboxylate groups, amide groups, acrylate groups, thiol groups, methacrylate groups, isocyanate groups, and combinations of the same. Table 1 lists the functional group resulting from each silane.

TABLE 1

Examples of silanes and their corresponding functional groups.

| Silane | Functional group |
|---|---|
| phenyltrimethoxysilane | Phenyl group, —C$_6$H$_5$ |
| Trimethoxy(propyl)silane | Saturated alkyl group, —CH$_2$(CH$_2$)CH$_3$ |
| Trimethoxymethylsilane | Methyl group, —CH$_3$ |
| Hexadecyltrimethoxysilane | Saturated alkyl group, —CH$_2$(CH$_2$)$_{14}$CH$_3$ |
| Tetraethyl orthosilicate | —OC$_2$H$_5$ |
| N-[3-(trimethoxysilyl)propyl]ethylenediamine | Ethylenediamine group, —(CH$_2$)$_3$NH(CH$_2$)$_6$NH$_2$ |
| (3-Aminopropyl)triethoxysilane | Amine group, —(CH$_2$)$_3$NH$_2$ |
| 3-(Aminophenoxy)propyltriethoxysilane | Aminophenoxy propyl group, —NH$_2$(C$_6$H$_4$O)(CH$_2$)$_3$ |
| N-(2-Aminoethyl)-3-aminopropyltrimethoxysilane | Aminoethyl aminopropyl group, —NH$_2$(CH$_2$)$_2$NH(CH$_2$)$_3$ |
| 11-Aminoundecyltrimethoxysilane | Aminoundecyl group, —NH$_2$(CH$_2$)$_{11}$ |
| N-(6-Aminohexyl)aminomethyltrimethoxysilane | Aminohexyl aminomethyl group, —NH$_2$(CH$_2$)$_6$ |
| N-(2-Aminoethyl)-11-aminoundecyltrimethoxysilane | Aminoethyl aminoundecyl group, —NH$_2$(CH$_2$)$_{11}$NH(CH$_2$)$_{11}$ |
| RSi(OR")$_3$ | R" is a methyl group (—CH$_3$), an ethyl group (—C$_2$H$_5$), and combinations of the same; and R is an alkyl group, an aryl group, and combinations of the same. |

Producing the functionalized silicate layer from a silane that contains the desired functional group results in a synthetic functionalized additive where the functional group is covalently bonded to the tetrahedral silicate layer of the synthetic layered magnesium silicate.

Referring to FIG. 1, an embodiment of a functionalized silicate additive is provided. Octahedral brucite layer 10 is sandwiched between two tetrahedral silicate layers 20. Functional groups 30 are covalently bonded to tetrahedral silicate layer 20. In some embodiments, functional groups 30 are selected from hydroxyl groups, amine groups, and combinations of the same. As functional groups 30 extend from tetrahedral silicate layer 20 away from octahedral brucite layer 10, functional groups 30 serve to separate the synthetic layered magnesium silicate 40.

References to "a functional group" should be interpreted to include multiple instances of a type of functional group bonded to the tetrahedral silicate layer and alternately multiple instances of multiple types of functional groups bonded to the tetrahedral silicate layer.

Talc is absent in the synthetic layered magnesium silicate. The synthetic layered magnesium silicates differ from talc in at least the following ways: (a) the synthetic layered magnesium silicates include organic functionalities, unlike talc which does not; (b) the synthetic layered magnesium silicates are partially crystalline; (c) the synthetic layered magnesium silicates contain covalently linked organic functionalities resulting in chemically strong bonding in contrast talc, even organically modified talc, has physically linked organic functionalities resulting in weak bonding; and (d) the structure of the synthetic layered magnesium silicates can be controlled during the synthesis process, whereas the structure of talc cannot be modified from the natural development.

A method of making or synthesizing the synthetic functionalized additive is provided. In a first step, an amount of the magnesium salt is mixed with a fluid medium to produce a magnesium-containing fluid. Any fluid medium suitable for suspending a metal oxide or metal hydroxide reaction. The fluid medium can include water, an alcohol, and combinations of the same. Examples of the alcohol can include methanol, ethanol, propanol, butanol, and combinations of the same. The amount of magnesium salt in the fluid medium can be in the range of about 3-15 wt %, and alternately in the range of about 5-7 wt % of the fluid medium.

An amount of the silane can be added to the magnesium-containing fluid to produce a reactant mix. The amount of silane added can be in between about 3 wt % of the fluid medium and about 12 wt % of the fluid medium and alternately between about 4 wt % of the fluid medium and about 6 wt % of the fluid medium. The amount of silane added can be determined to maintain a silicone to magnesium molar ratio in the synthetic layered magnesium silicate in the synthetic layered magnesium silicate of between about 0.7 and about 1.5, alternately between about 0.8 and about 1.4, alternately between about 1 and about 1.4. In at least one embodiment, the amount of silane added results in a silicone to magnesium molar ratio in the synthetic layered magnesium silicate of about 1.33.

Adding the amount of the silane to the magnesium-containing fluid is important to produce a synthetic functionalized additive having the layered structure. A change in the order of mixing, by adding the magnesium salt to the saline produces amorphous materials that do not possess the layered structure required of the synthetic functionalized additive.

An amount of aqueous hydroxide can be added to the reactant mix to produce the reaction mixture. The amount of aqueous hydroxide added can adjust the pH of the reactant mix. The amount of aqueous hydroxide can be added to the reactant mix to reach a target pH of the reaction mixture. The target pH of the reaction mixture can be between about 7 and about 12, and alternately between about 9 and about 10.

Each of the addition steps can be performed at a temperature in the range between about 20° C. and about 120° C., alternately between about 20° C. and about 110° C., alternately between about 20° C. and about 80° C., alternately between about 50° C. and about 80° C., alternately at a temperature between about 20° C. and about 30° C., alternately a temperature of about 25° C. Greater reaction temperatures can reduce the reaction time and can contribute to greater crystallinity. Each of the addition steps can be performed at ambient pressure. The reaction mixture can be prepared in one reaction vessel. The reaction vessel can be fitted with a stirring mechanism such that the mixture is constantly stirred during the addition steps. Each addition step can be followed by a period of mixing. The reaction vessel can be fitted with a condenser. The reaction vessel can be configured for hydrothermal reaction, where the reaction mixture can be maintained at a pressure at the reflux conditions.

The reaction mixture can be mixed for a mixing period. The mixing period can be between about four hours and about one week, alternately between about ten hours and about three days, alternately between about fifteen hours and about one day. Crystallinity of the resulting product can be varied by varying the duration mixing period; that is, a greater mixing period duration can produce greater crystallinity. Mixing the reaction mixture under an alkaline condition can enable the formation of brucite and the subsequent hydrolysis of the silanes.

Following the mixing period, the reaction mixture can be refluxed in the reaction vessel for a reflux period to produce the product mix. The reflux period can be greater than about 1 hour, alternately greater than about 5 hours, alternately greater than about 10 hours, alternately greater than about 24 hours, alternately between about 24 hours and about 72 hours, alternately between about 24 hours and about 48 hours. During the reflux period, the temperature in the reaction vessel can be increased to the refluxing condition. The refluxing condition can be the boiling point of the reaction mixture. The refluxing condition can be between about 70° C. and about 120° C. As components boil, they can enter the condenser fitted onto the reaction vessel. The refluxing condition allows the reaction of silanes to form the tetrahedral silicate layer on either side of the layer of octahedral brucite, resulting in the functionalized synthetic additive.

The formation of the layer of octahedral brucite can begin upon addition of the aqueous hydroxide. Hydrolysis of the silanes can begin upon addition of the aqueous hydroxide. The condensation reactions of the silanes can begin as the temperature in the reaction mixture reaches the refluxing condition. The condensation reactions of the silanes can continue during the reflux period. The functionalized silicate layers form on the layer of octahedral brucite during the reflux period.

Following the refluxing step, the product mix can be subjected to one or more treatment operations to separate the solid synthetic functionalized magnesium silicate from the other liquids in the product mix. The treatment operations can include reducing the temperature of the product mix separating the solid synthetic functionalized magnesium silicate, washing the separated solids and drying the solids under vacuum. Separating the solid synthetic functionalized magnesium silicate can be performed using any separation unit capable of separating solids from liquids. Examples of separation units suitable for separating solids from liquids include filtration and centrifuging. The separated solids can be washed with deionized water. Drying under vacuum can be done at temperatures greater than ambient temperature or at room temperature.

The length of the reflux period can influence the crystallinity of the synthetic layered magnesium silicates. Hydrothermal reaction during the reflux period can allow crystallization and growth in the lateral dimension. The longer the reflux period the greater the size of the lateral dimension. The reflux conditions can also improve the crystallinity of the functionalized silicate layers. The condensation reactions of the silanes involve the removal of water molecules from the edges of the inorganic layer of octahedral brucite and the hydrolysis products of silanes, a longer reflux period provides more time for these reactions resulting in improved crystallinity.

Advantageously, synthesizing the synthetic layered magnesium silicate allows the physical properties of the synthetic layered magnesium silicate to be tailored to meet desired specifications. Examples of the physical properties that can be tailored include the crystallinity, the organic moieties, the lateral dimensions, and combinations of the same. The crystallinity of the synthetic layered magnesium silicate can be tailored to possess low crystallinity, moderate crystallinity, or high crystallinity. The organic moieties can be tailored to include hydrophobic organic moieties, hydrophilic organic moieties, and a combination of the same. The lateral dimensions, such as the length, height and width, can be modified by increasing the reaction time. Tailoring the physical properties changes the thixotropic behavior, the viscosity of the well fluids, and combinations of the same. In at least one embodiment, tailoring the physical properties ensures the synthetic layered magnesium silicate contains enough structure to provide stability and viscosity in the well fluids.

The method of producing the synthetic functionalized additive does not involve grafting the organic moieties. Advantageously, the method of producing the synthetic functionalized additive provides a method for in situ formation, which results in covalently linked silicon to oxide (Si—O) bonds. Covalently linked Si—O bonds have increased structural integrity exhibiting reduced likelihood of detachment of the organic moieties.

The synthetic functionalized additive can be used as a viscosifier, a thixotropic control additive, a suspension additive, a nucleating agent additive, and a release rate control additive. The synthetic functionalized additives can be used as additives in well fluids. Well fluids can include drilling fluids, packer fluids, lost circulation fluids, production fluids, and combinations of the same. In general, the synthetic functionalized additives can be used in place of organophilic nanosilicas.

The rheologically modified well fluid can include a water-based continuous phase. The water-based continuous phase can include a brine (that is, an aqueous solution having at least one inorganic salt such as sodium bromide (NaBr), sodium chloride (NaCl), calcium chloride ($CaCl_2$)), potassium chloride (KCl), zinc chloride (ZnCl), cesium formate (HCOOCs), potassium formate (HCOOK), sodium formate (HCOONa) and potassium iodide (KI)). Brines can be tailored to particular well conditions with a broad range of salts. Typical brines can have densities between about 1 gram per cubic centimeter ($g/cm^3$) and about 2.4 $g/cm^3$ at standard temperature and pressure.

The rheologically modified well fluid can include a weighting agent. As used throughout this disclosure, the term "weighting agent" refers to finely divided solid material that is used to increase the density of a drilling fluid. Nonlimiting examples of weighting agents include barite, hematite, calcium carbonate, siderite, and ilmenite, manganese oxide, iron oxides and their various minerals, barium sulfate, barium oxide, barium hydroxide, barium chloride.

The rheologically modified well fluid can include a viscosifying polymer, including biopolymers and modified biopolymers and synthetic polymers. Nonlimiting examples of viscosifying biopolymers include carboxymethyl cellulose, lignosulfonate, hydroxyethyl cellulose, guar gum, xanthan gum, and hydroxypropyl guar. Nonlimiting examples of viscosifying synthetic polymers include amine/amide fatty acid copolymers, acrylates and acrylate copolymers, hydrolyzed polyacrylamide and their ionic salts, maleic anhydride and styrene copolymers based polymers. Generally, the viscosifying effect of a biopolymer is degraded as temperature increases. In some embodiments polyelectrolytes are added to improve and maintain the viscosifying effect of the biopolymer at temperatures which otherwise would result in the complete loss of the viscosifying effect of the biopolymer alone.

A polyelectrolyte is a polymer having repeating units bearing an electrolyte group. The polyelectrolyte can have cationic and anionic groups, and can be a synthetic or natural polymer. In at least one embodiment the rheologically modified well fluid can have at least two oppositely charged polymers (that is, a polycation and a polyanion). By way of example and not limitation, an example of a polyelectrolyte is cationic partially hydrolyzed polyacrylamide (cationic PHPA). Cationic polyacrylamides are acrylamide polymers that have positively charged chemical groups attached to at least some of the polymer's pendant amide groups, or acrylamide polymers that have been copolymerized with monomers containing positively charged pendant groups.

The association of a polycation with an anionic surfactant in the rheologically modified well fluid can improve and maintain viscosity at temperatures which would otherwise result in a degraded viscosifying effect. Nonlimiting examples of suitable anionic surfactants include alkylbenzene sulfonates, alkyl sulfonates, sodium salts of fatty acids, sodium dodecylbenzene sulfonate, sodium dodecyl sulfonate, sodium oleate, sodium palmitate, sodium stearate, alkaline metal salts of fatty acids, and alkaline earth metal salts of fatty acids. In at least one embodiment, the rheologically modified well fluid can include a polycation such as cationic PHPA and an anionic surfactant such as sodium dodecylbenzene sulfonate to maintain increased viscosity up to a high temperature between about 80° C. and about 165° C., alternately between about 90° C. and about 165° F., alternately between about 75° C. and about 160° C.

The rheologically modified well fluid can also include additional components (such as weighting agents, fluid loss additives, shale inhibitors, alkalinity control agents) known to one of ordinary skill in the relevant art. By way of example and not limitation, Table 2 provides an example of an aqueous-based well fluid composition having a synthetic functionalized additive.

TABLE 2

Example of an aqueous-based well fluid composition having a brine, biopolymer, polycation, anionic surfactant, fluid loss additive, shale inhibitor, and synthetic functionalized additive.

| Component | Weight percent |
|---|---|
| Sodium bromide brine (12.5 ppg) | 59.5 |
| Barite | 37.6 |
| Cationic partially hydrolyzed polyacrylamide | 0.7 |
| Sodium dodecylbenzene sulfonate | 0.7 |
| Shale inhibitor | 0.4 |
| Synthetic functionalized additive | 0.3 |
| Fluid loss additive | 0.3 |
| Magnesium oxide | 0.3 |
| Iron gluconate | 0.1 |
| Xantham gum | 0.1 |

Advantageously, the addition of the synthetic functionalized additive can improve and maintain suitable viscosity of the rheologically modified well fluid. The synthetic functionalized additive can be mixed with a well fluid as a viscosifier to produce a rheologically modified well fluid. The amount of synthetic functionalized additive in the rheologically modified well fluid can be in an amount between about 0.1 weight per volume percent (wt/vol %) and about 25 wt/vol %, alternately about 0.5 wt/vol % and about 5 wt/vol %, alternately between about 1 wt/vol % and about 4 wt/vol %, alternately between about 1.5 wt/vol % and about 3.5 wt/vol %. In at least one embodiment the amount of the synthetic functionalized additive is about 2 wt/vol %. For example purposes only, a 0.1 wt/vol % rheologically modified well fluid can contain 0.1 grams of the synthetic functionalized additive in 99.9 milliliters (mL) of the well fluid. For example purposes only, a 20 wt/vol % rheologically modified well fluid can contain 20 grams of the synthetic functionalized additive in 80 mL of the well fluid. The rheologically modified well fluid can be injected into a well.

The rheologically modified well fluid can be prepared by combining the synthetic functionalized additive with an intermediate well fluid composition. As used here, the term "intermediate well fluid composition" refers to a composition made in the process of preparing a well fluid before the synthetic functionalized additive is added, the composition having at least one well fluid component (such as brine, biopolymer, polyelectrolyte, surfactant, shale inhibitor, fluid loss additive, weighting agent, etc.) without the synthetic functionalized additive. In some embodiments the rheologically modified well fluid can be prepared by mixing the synthetic functionalized additive with the intermediate well fluid composition for a period of time, and then adding and mixing one or more additional well fluid components at spaced intervals. By way of example and not limitation, the rheologically modified well fluid can be prepared by first mixing the water-based continuous phase with the synthetic functionalized additive for a period of time (for example, five minutes), where the water-based continuous phase is the intermediate well fluid composition. Then, following mixing the water-based continuous phase with the synthetic functionalized additive, adding and mixing the biopolymer for a period of time (for example, five minutes), then adding and mixing the polyelectrolyte for a period of time (for example, five minutes), and so forth; continuing in this manner with each additional desired well fluid component.

In some embodiments the fluid is prepared by mixing a brine with the synthetic functionalized additive for a period of time, then adding and mixing a biopolymer for a period of time, then adding and mixing a polyelectrolyte for a period of time, and then adding and mixing a surfactant for a period of time. In at least one embodiment the polyelectrolyte is a polycation and the surfactant is an anionic surfactant. In some embodiments the rheologically modified well fluid is further prepared by adding and mixing at least one of the following well fluid components at spaced intervals: fluid loss additive, shale inhibitor, alkalinity control agent, weighting agent.

The mixing of the synthetic functionalized additive with the intermediate well fluid composition is carried out such that shear forces are applied to the synthetic functionalized additive and intermediate well fluid composition. The mixing can be carried out with a high-shear mixer.

In any process involving mixing one or more well fluid components for a period of time, the components should be mixed for a period of time that is at least five minutes. Mixing can be carried out for much longer periods of time. By way of example and not limitation, the mixing can be carried out for a period of time that is between about 5 minutes and about 300 minutes, alternately between about 5 minutes and about 240 minutes, alternately between about 5 minutes and about 180 minutes, alternately between about 5 minutes and about 120 minutes, alternately between about 5 minutes and about 90 minutes, alternately between about 5 minutes and about 60 minutes, alternately between about 5 minutes and about 30 minutes, alternately between about 5 minutes and about 20 minutes, alternately between about 5 minutes and about 15 minutes, alternately between about 5 minutes and about 10 minutes. In at least one embodiment the components can be mixed for a period of time that is about 5 minutes.

In some embodiments the rheologically modified well fluid can be further prepared by aging the well fluid mixture having the synthetic functionalized additive. The aging process can be carried out by introducing the well fluid mixture having the synthetic functionalized additive to a pressure vessel, heating the well fluid mixture, pressurizing the well fluid mixture in the pressure vessel, and maintaining a pressure greater than atmospheric pressure and a temperature greater than ambient temperature for a period of time.

In some embodiments the aging process includes rolling the well fluid mixture having the synthetic functionalized additive for a period of time in a hot roller oven. In some embodiments the rolling, heating, and pressurizing are carried out simultaneously; that is, the well fluid mixture having the synthetic functionalized additive is rolled at a pressure above atmospheric pressure and a temperature above ambient temperature for a period of time.

In some embodiments the well fluid mixture having the synthetic functionalized additive is aged at a pressure that is between about 1,000 kilopascals (kPA) and about 7,000 kPa, alternately between about 2,500 kPa and about 5,000 kPa, alternately between about 2,500 kPa and about 4,500 kPa, alternately between about 3,000 kPa and about 4,000 kPa. In at least one embodiment the mixed well composition fluid having the synthetic functionalized additive is aged at a pressure of about 3,500 kPa. In at least one embodiment nitrogen gas can be used to pressurize the pressure vessel.

In some embodiments the well fluid mixture having the synthetic functionalized additive is aged at a temperature that is between about 50° C. and about 240° C., alternately between about 100° C. and about 200° C., alternately between about 120° C. and about 180° C. In at least one embodiment the well fluid mixture having the synthetic functionalized additive is aged at a temperature that is about 150° C.

In some embodiments the aging process is carried out for a period of time that is between about 1 hour and about 48 hours, alternately between about 1 hour and about 36 hours, alternately between about 1 hour and about 24 hours, alternately between about 1 hour and about 20 hours. In at least one embodiment the aging process is carried out for about 16 hours.

EXAMPLES

The following examples are included to demonstrate embodiments of the disclosure, and should be considered nonlimiting. The techniques and compositions disclosed in the examples which follow represent techniques and compositions discovered to function well in the practice of the disclosure, and thus can be considered to constitute modes for its practice. However, changes can be made to the embodiments disclosed in the examples without departing from the spirit and scope of the disclosure.

Example 1

A synthetic layered magnesium silicate was synthesized by dissolving magnesium chloride hexahydrate in ethanol and adding tetraethoxy orthosilicate [$Si(OCH_5)_4$] and aqueous sodium hydroxide. The solution was stirred at ambient temperature. The resulting suspension was stirred for five hours and then refluxed for 48 hours. Synthetic layered magnesium silicates precipitated from the solution. The solution was centrifuged to separate the synthetic layered magnesium silicates from the solution, and the synthetic layered magnesium silicates were washed with deionized water and dried. Hydroxyl functional groups were covalently bonded to the tetrahedral silicate layers of the synthetic layered magnesium silicates.

Example 2

A synthetic layered magnesium silicate was synthesized by dissolving magnesium chloride hexahydrate in ethanol and adding aminopropyltriethoxysilane [$H_2N(CH_2)_3Si(OC_2H_5)_3$] and aqueous sodium hydroxide. The solution was stirred at ambient temperature. The resulting suspension was stirred for five hours and then refluxed for 48 hours. Synthetic layered magnesium silicates precipitated from the solution. The solution was centrifuged to separate the synthetic layered magnesium silicates from the solution, and the synthetic layered magnesium silicates were washed with deionized water and dried. Amine functional groups were covalently bonded to the tetrahedral silicate layers of the synthetic layered magnesium silicates.

Example 3

Figure 2:
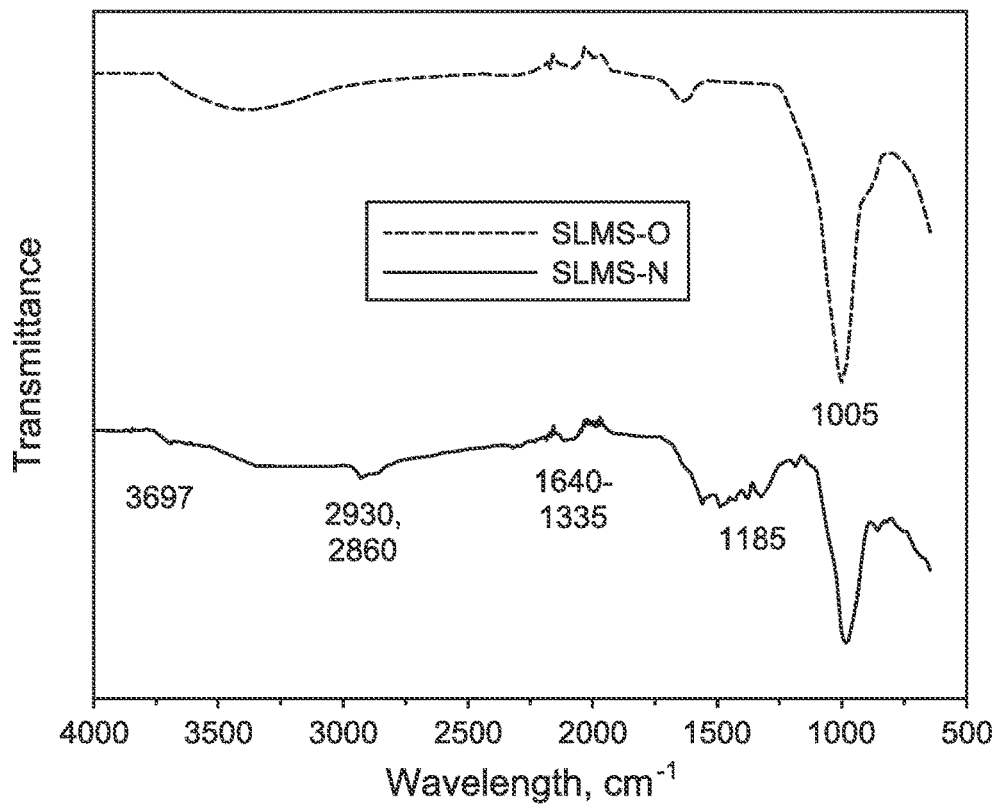
FIG. 2 shows a plot of example Fourier transform spectrum data from two rheologically modified well fluids.

The synthetic layered magnesium silicates prepared in Example 1 and Example 2 were analyzed using fourier transform infrared (FTIR) spectroscopy and powder x-ray diffraction (PXRD). FIG. 2 shows the FTIR spectrum of the two synthetic layered magnesium silicates of Example 1 and Example 2; a synthetic layered magnesium silicate having hydroxyl groups covalently bonded to the tetrahedral silicate layers (SLMS-O), and a synthetic layered magnesium silicate having amine groups covalently bonded to the tetrahedral silicate layers (SLMS-N). The FTIR spectrum shows characteristic vibration modes for inorganic layered silicates and organic moieties covalently bonded to the tetrahedral silicate layers of the synthetic layered magnesium silicates. The bands at 3697 cm$^{-1}$ and 1005 cm$^{-1}$ can be attributed respectively to MgO—H and Si—O—Si stretching. In the case of SLMS-N, the methyl and methylene groups produced vibrational bands at 2930 cm$^{-1}$ and 2860 cm$^{-1}$. The covalently bonded organic moiety, propylamine, is discernible from the stretching at 1185 cm$^{-1}$. The amine groups produced bands between 1640 cm$^{-1}$ and 1345 cm$^{-1}$. The hydroxyl groups in SLMS-O produced a characteristic broad peak around 3400 cm$^{-1}$ from O—H stretching vibration.

Figure 3:
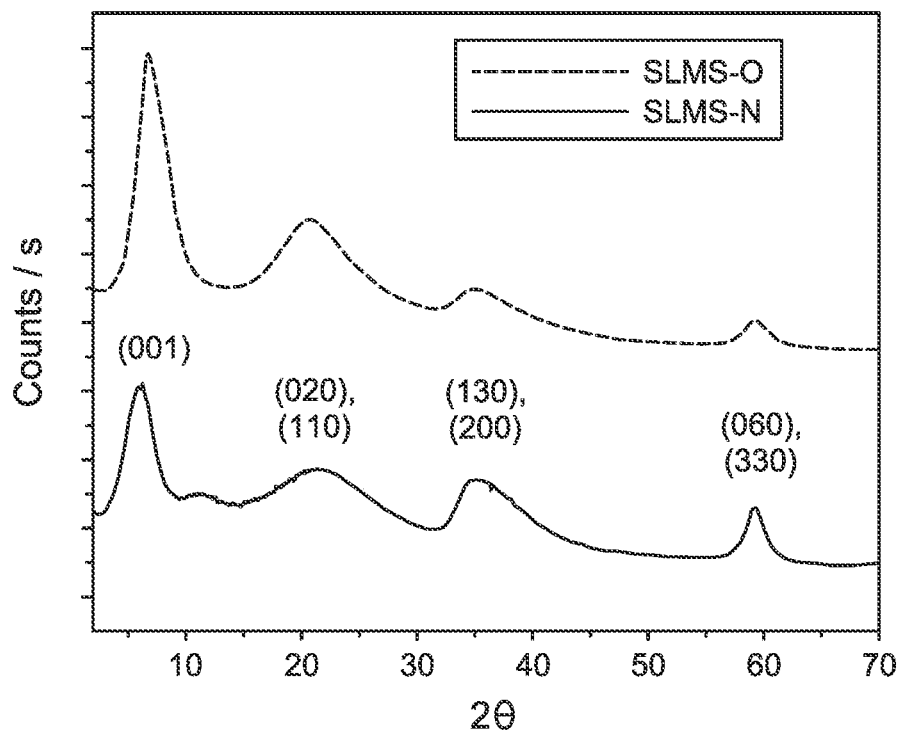
FIG. 3 shows a plot of example powder x-ray diffraction pattern data from two rheologically modified well fluids.

Powder x-ray diffraction patterns for SLMS-O and SLMS-N are shown in FIG. 3. The PXRD reflections of SLMS-O and SLMS-N show broader peaks attributable to diffraction caused by the presence of organic moieties in the interlayer space, the nanodimensional structure of the layered materials, and their synthetic nature. The space between layers indicated at 001, 1.1 nanometers (nm) for SLMS-0 and 1.25 nm for SLMS-N, suggests the presence of hydroxyl groups and propylamine groups respectively. The intra-layer reflections at 060 and 330 are characteristic of a 2:1 trioctahedral phyllosilicate structure. The reflections at 020/110 and 130/200 indicate that the layered materials can accommodate a range of organic functionalities without deterioration of the crystalline structures.

Example 4

Figure 4:
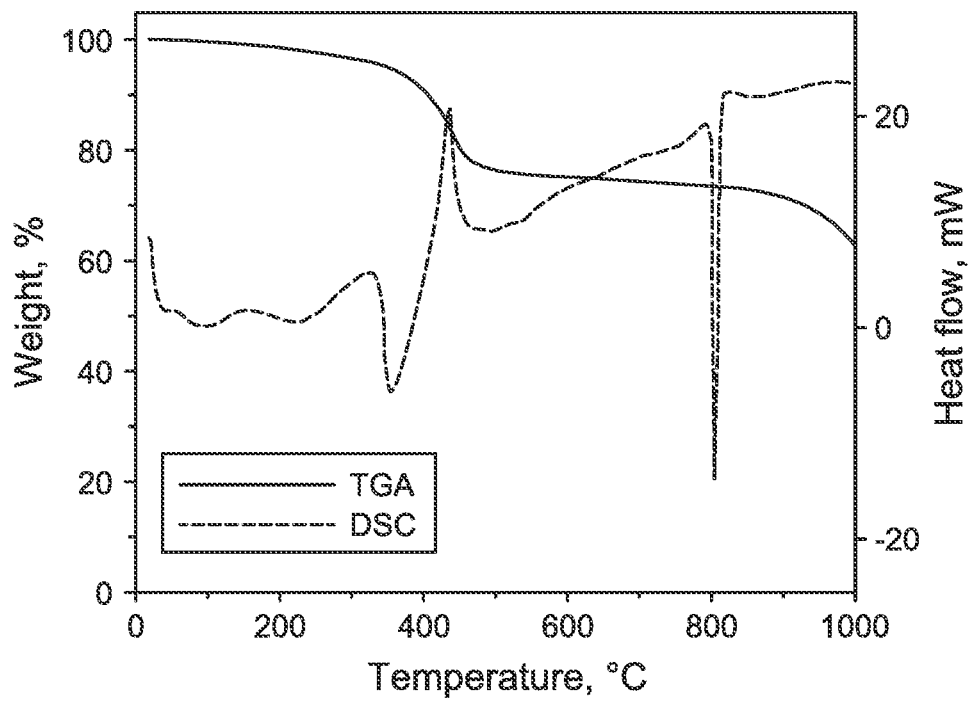
FIG. 4 shows a plot of example thermogravimetric analysis data and differential scanning calorimetric analysis data for a rheologically modified well fluid.

The synthetic layered magnesium silicate of Example 2 (SLMS-N) was analyzed using thermogravimetric analysis (TGA) and differential scanning calorimetric (DSC) analysis, and the results are shown in FIG. 4. Thermogravimetric analysis was performed for SLMS-N at temperatures up to 1,000° C. The TGA curve demonstrates that SLMS-N is stable up to about 340° C. At temperatures above about 340° C. the organic functional groups begin to decompose. Not intending to be limited by any technical theory, it is believed that the thermal stability of SLMS-N can be attributed to its hybrid organic-inorganic nature.

Example 5

A well fluid without synthetic layered magnesium silicates and a rheologically modified well fluid with a synthetic layered magnesium silicate having hydroxyl functional groups (RMWF-O) were prepared. The RMWF-O and the well fluid without synthetic layered magnesium silicates both had a polycation (cationic PHPA) and an anionic surfactant (sodium dodecylbenzene sulfonate). The water-based continuous phase was a sodium bromide brine with density of about 1.5 kilograms per liter (kg/L). Each well fluid had density of 1.95 kg/L. The compositions of the RMWF-O and the well fluid without synthetic layered magnesium silicates are provided in Table 3.

TABLE 3

Composition of a well fluid without synthetic layered magnesium silicates and a rheologically modified well fluid with synthetic layered magnesium silicates having hydroxyl functional groups (RMWF-O).

| Component | Well fluid without synthetic layered magnesium silicates (g) | RMWF-O (g) |
| --- | --- | --- |
| Sodium bromide brine | 408.0 | 408.0 |
| Barite | 257.6 | 257.6 |
| Cationic PHPA | 4.5 | 4.5 |
| Sodium dodecylbenzene sulfonate | 4.5 | 4.5 |
| Shale inhibitor | 3.0 | 3.0 |
| Synthetic layered magnesium silicate having hydroxyl functional groups | — | 2.0 |
| Fluid loss additive | 2.3 | 2.3 |
| Magnesium oxide | 2.0 | 2.0 |
| Iron gluconate | 1.0 | 1.0 |
| Xantham gum | 0.5 | 0.5 |

The components of the well fluids were mixed with a high-shear mixer. The well fluid without synthetic layered magnesium silicates was prepared by mixing the sodium bromide brine with the xanthan gum for five minutes, then adding and mixing the cationic PHPA for five minutes, then adding and mixing the sodium dodecylbenzene sulfonate for five minutes, then adding and mixing the fluid loss additive for five minutes, then adding and mixing the shale inhibitor for five minutes, then adding and mixing the magnesium oxide for five minutes, then adding and mixing the iron gluconate for five minutes, and then adding and mixing the barite for ten minutes. The RMWF-O was prepared by first mixing the sodium bromide brine with the synthetic layered magnesium silicate having hydroxyl functional groups for five minutes, then adding and mixing the xanthan gum for five minutes, then adding and mixing the cationic PHPA for five minutes, then adding and mixing the sodium dodecylbenzene sulfonate for five minutes, then adding and mixing the fluid loss additive for five minutes, then adding and mixing the shale inhibitor for five minutes, then adding and mixing the magnesium oxide for five minutes, then adding and mixing the iron gluconate for five minutes, then adding and mixing the barite for ten minutes. In this example, the well fluids were evaluated before and after aging. The aging process included separately pressurizing the well fluids to about 3,500 kPa with nitrogen, heating the well fluids to about 150° C., and hot-rolling the separate vessels containing the well fluids at about 150° C. for 16 hours. The well fluids were then cooled and analyzed at atmospheric pressure and ambient temperature.

The rheological properties of the prepared aged and non-aged well fluids were determined from measurements made with a rotational rheometer. The well fluids were analyzed at ambient temperature and atmospheric pressure. Rheological properties of the well fluids were derived from the dial readings on the rheometer at various rotational speeds. The data measured by the rheometer is shown in Table 4A; the rotational speed shown in rotations per minute (rpm) and the dial readings centipoise (cP). The ten-second and ten-minute gel strength of the well fluids were also measured and included in Table 4A. The ten-second and ten-minute gel strength were measured after allowing the well fluid to set quiescently for ten seconds and ten minutes respectively at low shear rate (maximum 3 rpm). The ten-second and ten-minute gel strength have units of centipoise.

TABLE 4A

Rheometer dial readings of aged and non-aged well fluid without synthetic layered magnesium silicates, and aged and non-aged rheologically modified well fluid with synthetic layered magnesium silicates having hydroxyl functional groups (RMWF-O) at various rotational speeds. The ten-second and ten-minute gel strength of the well fluids are also shown.

| Rotational speed (rpm) | Non-aged well fluid without synthetic layered magnesium silicates (cP) | Aged well fluid without synthetic layered magnesium silicates (cP) | Non-aged RMWF-O (cP) | Aged RMWF-O (cP) |
|---|---|---|---|---|
| 600 | 159 | 230 | 161 | 275 |
| 300 | 102 | 133 | 115 | 165 |
| 200 | 79 | 95 | 81 | 120 |
| 100 | 50 | 52 | 51 | 68 |
| 6 | 11 | 5 | 11 | 8 |
| 3 | 8 | 4 | 9 | 6 |
| Ten-second gel strength | 9 | 4.5 | 10 | 7 |
| Ten-minute gel strength | 10 | 4.5 | 11 | 14 |

The plastic viscosity, yield point, apparent viscosity, and low shear yield point were calculated using Bingham Plastic Model equations. The rheological properties of the well fluids are shown in Table 4B.

TABLE 4B

Rheological properties of aged and non-aged well fluid without synthetic layered magnesium silicates, and aged and non-aged rheologically modified well fluid with synthetic layered magnesium silicates having hydroxyl functional groups (RMWF-O). Values for plastic viscosity, yield point, apparent viscosity, and low shear yield point are derived from Bingham Plastic Model equations. The ten-second and ten-minute gel strength of the well fluids were measured directly.

| | Non-aged well fluid without synthetic layered magnesium silicates (cP) | Aged well fluid without synthetic layered magnesium silicates (cP) | Non-aged RMWF-O (cP) | Aged RMWF-O (cP) |
|---|---|---|---|---|
| Plastic viscosity | 57 | 97 | 46 | 110 |
| Yield point | 45 | 36 | 69 | 55 |
| Apparent viscosity | 80 | 115 | 81 | 137.5 |
| Low shear yield point | 5 | 3 | 7 | 4 |
| Ten-second gel strength | 9 | 4.5 | 10 | 7 |
| Ten-minute gel strength | 10 | 4.5 | 11 | 14 |

The yield point of the non-aged RMWF-O is significantly greater than the yield point of the non-aged well fluid without synthetic layered magnesium silicates, indicating that the non-aged RMWF-O has an improved capacity for carrying suspended cuttings. Though sufficient plastic viscosity is necessary for maintaining suitable viscosity, greater plastic viscosity can cause a reduction in the rate of penetration. The plastic viscosity of the non-aged RMWF-O is maintained at a suitable level, and the rate of penetration should not be reduced because the value does not exceed the value of the plastic viscosity of the non-aged well fluid without synthetic layered magnesium silicates.

The yield point of the aged RMWF-O is significantly greater than the yield point of the aged well fluid without synthetic layered magnesium silicates, indicating that the rheologically modified well fluid has an improved capacity for carrying suspended cuttings. The plastic viscosity of the aged RMWF-O is slightly greater, but suitable for many drilling applications.

Example 6

The example described in Example 5 was repeated with the addition of calcium montmorillonite to simulate contamination of the drilling fluids as it occurs during normal drilling operations. In this example a well fluid without synthetic layered magnesium silicates and RMWF-O were prepared similar to Example 5, except that calcium montmorilonite was added. The rheologically modified well fluid and the well fluid without synthetic layered magnesium silicates both had a polycation (cationic PHPA) and an anionic surfactant (sodium dodecylbenzene sulfonate). The well fluids were prepared similar to the well fluid without synthetic layered magnesium silicates and RMWF-O described in Example 5. The well fluids were evaluated before and after aging. The compositions of the rheologically modified well fluid and the well fluid without synthetic layered magnesium silicates are provided in Table 5.

TABLE 5

Composition of a well fluid without synthetic layered magnesium silicates and a rheologically modified well fluid with synthetic layered magnesium silicates having hydroxyl functional groups (RMWF-O); the well fluids being contaminated with calcium montmorillonite to simulate contamination as it occurs during normal drilling operations.

| Component | Well fluid without synthetic layered magnesium silicates (g) | RMWF-O (g) |
|---|---|---|
| Sodium bromide brine | 408.0 | 408.0 |
| Barite | 257.6 | 257.6 |
| Cationic PHPA | 4.5 | 4.5 |
| Sodium dodecylbenzene sulfonate | 4.5 | 4.5 |
| Shale inhibitor | 3.0 | 3.0 |
| Synthetic layered magnesium silicate having hydroxyl functional groups | — | 2.0 |
| Fluid loss additive | 2.3 | 2.3 |
| Magnesium oxide | 2.0 | 2.0 |
| Iron gluconate | 1.0 | 1.0 |
| Xantham gum | 0.5 | 0.5 |
| Calcium montmorillonite | 20 | 20 |

Each well fluid had density of about 2.4 kg/L. The components of the well fluids were mixed with a high-shear mixer similar to Example 5, except that the calcium montmorillonite was added and mixed for ten minutes after all other components were mixed.

The well fluids were evaluated before and after aging. The aging process included separately pressurizing the well fluids to about 3,500 kPa with nitrogen, heating the well fluids to about 150° C., and hot-rolling the separate vessels containing the well fluids at about 150° C. for 16 hours. The well fluids were then cooled and analyzed at atmospheric pressure and ambient temperature.

The rheological properties of the prepared aged and non-aged well fluids were determined from dial readings obtained from a rotational rheometer. The well fluids were analyzed at ambient temperature and atmospheric pressure. Rheological properties of the well fluids were derived from the dial readings on the rheometer at various rotational speeds. The data measured by the rheometer is shown in Table 6A

TABLE 6A

Rheometer dial readings of aged and non-aged well fluid without synthetic layered magnesium silicates, and aged and non-aged rheologically modified well fluid with synthetic layered magnesium silicates having hydroxyl functional groups (RMWF-O) at various rotational speeds; the well fluids being contaminated with calcium montmorillonite to simulate contamination as it occurs during normal drilling operations. The ten-second and ten-minute gel strength of the well fluids are also shown.

| Rotational speed (rpm) | Non-aged well fluid without synthetic layered magnesium silicates (cP) | Aged well fluid without synthetic layered magnesium silicates (cP) | Non-aged RMWF-O (cP) | Aged RMWF-O (cP) |
|---|---|---|---|---|
| 600 | 220 | >300 | 210 | >300 |
| 300 | 125 | 220 | 131 | 215 |
| 200 | 95 | 160 | 100 | 155 |
| 100 | 60 | 88 | 64 | 86 |
| 6 | 12 | 12 | 14 | 11 |
| 3 | 10 | 10 | 11 | 9 |
| Ten-second gel strength | 10 | 10 | 11 | 10 |
| Ten-minute gel strength | 11 | 12 | 13 | 14 |

The plastic viscosity, yield point, apparent viscosity, and low shear yield point were calculated using Bingham Plastic Model equations. The rheological properties of the well fluids are shown in Table 6B.

TABLE 6B

Rheological properties of aged and non-aged well fluid without synthetic layered magnesium silicates, and aged and non-aged rheologically modified well fluid with synthetic layered magnesium silicates having hydroxyl functional groups (RMWF-O); the well fluids being contaminated with calcium montmorillonite to simulate contamination as it occurs during normal drilling operations. Values for plastic viscosity, yield point, apparent viscosity, and low shear yield point are derived from Bingham Plastic Model equations. The ten-second and ten-minute gel strength of the well fluids were measured directly.

|  | Non-aged well fluid without synthetic layered magnesium silicates (cP) | Aged well fluid without synthetic layered magnesium silicates (cP) | Non-aged RMWF-O (cP) | Aged RMWF-O (cP) |
|---|---|---|---|---|
| Plastic viscosity | 95 | >80 | 79 | >85 |
| Yield point | 30 | <140 | 52 | <130 |
| Apparent viscosity | 110 | >150 | 105 | >150 |
| Low shear yield point | 8 | 8 | 8 | 7 |
| Ten-second gel strength | 10 | 10 | 11 | 10 |
| Ten-minute gel strength | 11 | 12 | 13 | 14 |

The yield point of the non-aged RMWF-O is significantly greater than the yield point of the non-aged well fluid without synthetic layered magnesium silicates, indicating that the RMWF-O has an improved capacity for carrying suspended cuttings. The plastic viscosity of the RMWF-O is maintained at a suitable level for carrying cuttings, and the rate of penetration should be increased because the value does not exceed the value of the plastic viscosity of the non-aged well fluid without synthetic layered magnesium silicates.

For both the aged well fluid without synthetic layered magnesium silicates and the aged RMWF-O the dial reading at 600 rpm was greater than the rotational rheometer's maximum measurable reading (that is, 300 cP). Due to equipment limitations, the measured data is only sufficient to derive minimum or maximum values for plastic viscosity, apparent viscosity, and yield point.

Example 7

A well fluid without synthetic layered magnesium silicates and a rheologically modified well fluid with a synthetic layered magnesium silicate having amine functional groups were prepared. The rheologically modified well fluid and the well fluid without synthetic layered magnesium silicates both had a polycation (cationic PHPA) and an anionic surfactant (sodium dodecylbenzene sulfonate). The water-based continuous phase was a sodium bromide brine with density of 1.5 kg/L. Each well fluid had density of 1.95 kg/L. The compositions of the rheologically modified well fluid and the well fluid without synthetic layered magnesium silicates are provided in Table 7.

TABLE 7

Composition of a well fluid without synthetic layered magnesium silicates and a rheologically modified well fluid with synthetic layered magnesium silicates having hydroxyl functional groups (RMWF-N).

| Component | Well fluid without synthetic layered magnesium silicates (g) | RMWF-N (g) |
|---|---|---|
| Sodium bromide brine | 408.0 | 408.0 |
| Barite | 257.6 | 257.6 |
| Cationic PHPA | 4.5 | 4.5 |
| Sodium dodecylbenzene sulfonate | 4.5 | 4.5 |
| Shale inhibitor | 3.0 | 3.0 |
| Synthetic layered magnesium silicate having amine functional groups | — | 2.0 |
| Fluid loss additive | 2.3 | 2.3 |
| Magnesium oxide | 2.0 | 2.0 |
| Iron gluconate | 1.0 | 1.0 |
| Xantham gum | 0.5 | 0.5 |

The components of the well fluids were mixed with a high-shear mixer. The well fluid without synthetic layered magnesium silicates was prepared by mixing the sodium bromide brine with the xanthan gum for five minutes, then adding and mixing the cationic PHPA for five minutes, then adding and mixing the sodium dodecylbenzene sulfonate for five minutes, then adding and mixing the fluid loss additive for five minutes, then adding and mixing the shale inhibitor for five minutes, then adding and mixing the magnesium oxide for five minutes, then adding and mixing the iron gluconate for five minutes, and then adding and mixing the barite for ten minutes. The rheologically modified well fluid was prepared by first mixing the sodium bromide brine with the synthetic layered magnesium silicate having amine functional groups for five minutes, then adding and mixing the xanthan gum for five minutes, then adding and mixing the cationic PHPA for five minutes, then adding and mixing the sodium dodecylbenzene sulfonate for five minutes, then adding and mixing the fluid loss additive for five minutes, then adding and mixing the shaleinhibitor for five minutes, then adding and mixing the magnesium oxide for five minutes, then adding and mixing the iron gluconate for five minutes, then adding and mixing the barite for ten minutes.

The well fluids were evaluated before and after aging. The aging process included separately pressurizing the well fluids to about 3,500 kPa with nitrogen, heating the well fluids to about 150° C., and hot-rolling the separate vessels containing the well fluids at about 150° C. for 16 hours. The well fluids were then cooled and analyzed at atmospheric pressure and ambient temperature.

The rheological properties of the well fluids were determined from rheometer dial readings. The well fluids were analyzed at ambient temperature and atmospheric pressure. Rheological properties of the well fluids were derived from the dial readings on the rheometer at various rotational speeds. The rheometer dial readings are shown in Table 8A.

TABLE 8A

Rheometer dial readings of aged and non-aged well fluid without synthetic layered magnesium silicates, and aged and non-aged rheologically modified well fluid with synthetic layered magnesium silicates having amine functional groups (RMWF-N) at various rotational speeds. The ten-second and ten-minute gel strength of the well fluids are also shown.

| Rotational speed (rpm) | Non-aged well fluid without synthetic layered magnesium silicates (cP) | Aged well fluid without synthetic layered magnesium silicates (cP) | Non-aged RMWF-N (cP) | Aged RMWF-N (cP) |
|---|---|---|---|---|
| 600 | 159 | 230 | 160 | 285 |
| 300 | 102 | 133 | 116 | 181 |
| 200 | 79 | 95 | 81 | 130 |
| 100 | 50 | 52 | 52 | 74 |
| 6 | 11 | 5 | 12 | 8 |
| 3 | 8 | 4 | 9.5 | 5 |
| Ten-second gel strength | 9 | 4.5 | 10 | 5.5 |
| Ten-minute gel strength | 10 | 4.5 | 11.5 | 10 |

The plastic viscosity, yield point, apparent viscosity, and low shear yield point were calculated using Bingham Plastic Model equations. The rheological properties of the well fluids are shown in Table 8B.

TABLE 8B

Rheological properties of aged and non-aged well fluid without synthetic layered magnesium silicates, and aged and non-aged rheologically modified well fluid with synthetic layered magnesium silicates having amine functional groups (RMWF-N). Values for plastic viscosity, yield point, apparent viscosity, and low shear yield point are derived from Bingham Plastic Model equations. The ten-second and ten-minute gel strength of the well fluids were measured directly.

| | Non-aged well fluid without synthetic layered magnesium silicates (cP) | Aged well fluid without synthetic layered magnesium silicates (cP) | Non-aged RMWF-N (cP) | Aged RMWF-N (cP) |
|---|---|---|---|---|
| Plastic viscosity | 57 | 97 | 44 | 104 |
| Yield point | 45 | 36 | 72 | 77 |
| Apparent viscosity | 80 | 115 | 80 | 142.5 |
| Low shear yield point | 5 | 3 | 7 | 2 |
| Ten-second gel strength | 9 | 4.5 | 10 | 5.5 |
| Ten-minute gel strength | 10 | 4.5 | 11.5 | 10 |

The yield point of the non-aged RMWF-N is significantly greater than the yield point of the non-aged well fluid without synthetic layered magnesium silicates, indicating that the rheologically modified well fluid has an improved capacity for carrying suspended cuttings. The plastic viscosity of the non-aged RMWF-N is maintained at a suitable level, and the rate of penetration should not be reduced because the plastic viscosity value for the rheologically modified well fluid does not exceed the value of the plastic viscosity of the non-aged well fluid without synthetic layered magnesium silicates.

The yield point of the aged RMWF-N is more than double the yield point of the aged well fluid without synthetic layered magnesium silicates, indicating that the rheologically modified well fluid has improved capacity for carrying suspended cuttings. The plastic viscosity of the aged RMWF-N is slightly greater than the plastic viscosity of the aged well fluid without synthetic layered magnesium silicates, but is still suitable for many drilling applications.

Example 8

The example described in Example 7 was repeated with the addition of calcium montmorillonite to simulate contamination of the drilling fluids as it occurs during normal drilling operations. A well fluid without synthetic layered magnesium silicates and RMWF-N were prepared similar to the well fluids of Example 7, except that calcium montmorillonite was mixed with the well fluids to simulate contamination as it occurs during normal drilling operations. The rheologically modified well fluid and the well fluid without synthetic layered magnesium silicates both had a polycation (cationic PHPA) and an anionic surfactant (sodium dodecylbenzene sulfonate). The water-based continuous phase was a sodium bromide brine with density of 1.5 kg/L. Each well fluid had density of 1.95 kg/L. The compositions of the RMWF-N and the well fluid without synthetic layered magnesium silicates are provided in Table 9.

TABLE 9

Composition of a well fluid without synthetic layered magnesium silicates and a rheologically modified well fluid with synthetic layered magnesium silicates having hydroxyl functional groups (RMWF-N); the well fluids being contaminated with calcium montmorillonite to simulate contamination as it occurs during normal drilling operations.

| Component | Well fluid without synthetic layered magnesium silicates (g) | RMWF-N (g) |
|---|---|---|
| Sodium bromide brine | 408.0 | 408.0 |
| Barite | 257.6 | 257.6 |
| Cationic PHPA | 4.5 | 4.5 |
| Sodium dodecylbenzene sulfonate | 4.5 | 4.5 |
| Shale inhibitor | 3.0 | 3.0 |
| Synthetic layered magnesium silicate having amine functional groups | — | 2.0 |
| Fluid loss additive | 2.3 | 2.3 |
| Magnesium oxide | 2.0 | 2.0 |
| Iron gluconate | 1.0 | 1.0 |
| Xantham gum | 0.5 | 0.5 |
| Calcium montmorillonite | 20 | 20 |

Each well fluid had density of about 2.4 kg/L. The components of the well fluids were mixed with a high-shear mixer similar to Example 6, except that the calcium montmorillonite was added and mixed for ten minutes after all other components were mixed.

The well fluids were evaluated before and after aging. The aging process included separately pressurizing the well fluids to about 3,500 kPa with nitrogen, heating the well fluids to about 150° C., and hot-rolling the separate vessels containing the well fluids at about 150° C. for 16 hours. The well fluids were then cooled and analyzed at atmospheric pressure and ambient temperature.

The rheological properties of the aged and non-aged well fluids were determined from measurements made with a rotational rheometer. The well fluids were analyzed at ambient temperature and atmospheric pressure. Rheological properties of the well fluids were derived from the dial readings on the rheometer at various rotational speeds. The data measured by the rheometer is shown in Table 10A.

TABLE 10A

Rheometer dial readings of aged and non-aged well fluid without synthetic layered magnesium silicates, and aged and non-aged rheologically modified well fluid with synthetic layered magnesium silicates having amine functional groups (RMWF-N) at various rotational speeds; the well fluids being contaminated with calcium montmorillonite to simulate contamination as it occurs during normal drilling operations. The ten-second and ten-minute gel strength of the well fluids are also shown.

| Rotational speed (rpm) | Non-aged well fluid without synthetic layered magnesium silicates (cP) | Aged well fluid without synthetic layered magnesium silicates (cP) | Non-aged RMWF-N (cP) | Aged RMWF-N (cP) |
| --- | --- | --- | --- | --- |
| 600 | 220 | >300 | 229 | >300 |
| 300 | 220 | 220 | 150 | 228 |
| 200 | 125 | 160 | 102 | 165 |
| 100 | 95 | 88 | 71 | 93 |
| 6 | 60 | 12 | 14 | 13 |
| 3 | 12 | 10 | 11 | 10 |
| Ten-second gel strength | 10 | 10 | 12 | 10 |
| Ten-minute gel strength | 10 | 12 | 14 | 16 |

The plastic viscosity, yield point, apparent viscosity, and low shear yield point were calculated using Bingham Plastic Model equations. The rheological properties of the well fluids are shown in Table 10B.

TABLE 10B

Rheological properties of aged and non-aged well fluid without synthetic layered magnesium silicates, and aged and non-aged rheologically modified well fluid with synthetic layered magnesium silicates having amine functional groups (RMWF-N); the well fluids being contaminated with calcium montmorillonite to simulate contamination as it occurs during normal drilling operations. Values for plastic viscosity, yield point, apparent viscosity, and low shear yield point are derived from Bingham Plastic Model equations. The ten-second and ten-minute gel strength of the well fluids were measured directly.

| | Non-aged well fluid without synthetic layered magnesium silicates (cP) | Aged well fluid without synthetic layered magnesium silicates (cP) | Non-aged RMWF-N (cP) | Aged RMWF-N (cP) |
| --- | --- | --- | --- | --- |
| Plastic viscosity | 95 | >80 | 79 | >72 |
| Yield point | 30 | <140 | 71 | <156 |
| Apparent viscosity | 110 | >150 | 114.5 | >150 |
| Low shear yield point | 8 | 8 | 8 | 7 |
| Ten-second gel strength | 10 | 10 | 12 | 10 |
| Ten-minute gel strength | 11 | 12 | 14 | 16 |

The yield point of the non-aged RMWF-N is significantly greater than the yield point of the non-aged well fluid without synthetic layered magnesium silicates, indicating that the rheologically modified well fluid has an improved capacity for carrying suspended cuttings. The plastic viscosity of the non-aged RMWF-N is maintained at a suitable level, and the rate of penetration should not be reduced because the plastic viscosity value for the non-aged RMWF-N does not exceed the value of the plastic viscosity of the well fluid without synthetic layered magnesium silicates.

For both the aged well fluid without synthetic layered magnesium silicates and the aged RMWF-N, dial readings at 600 rpm were greater than the rotational rheometer's maximum measurable reading (that is, 300 cP). Due to equipment limitations, the measured data is only sufficient to derive minimum or maximum values for plastic viscosity, apparent viscosity, and yield point.

Example 13

Figure 5:
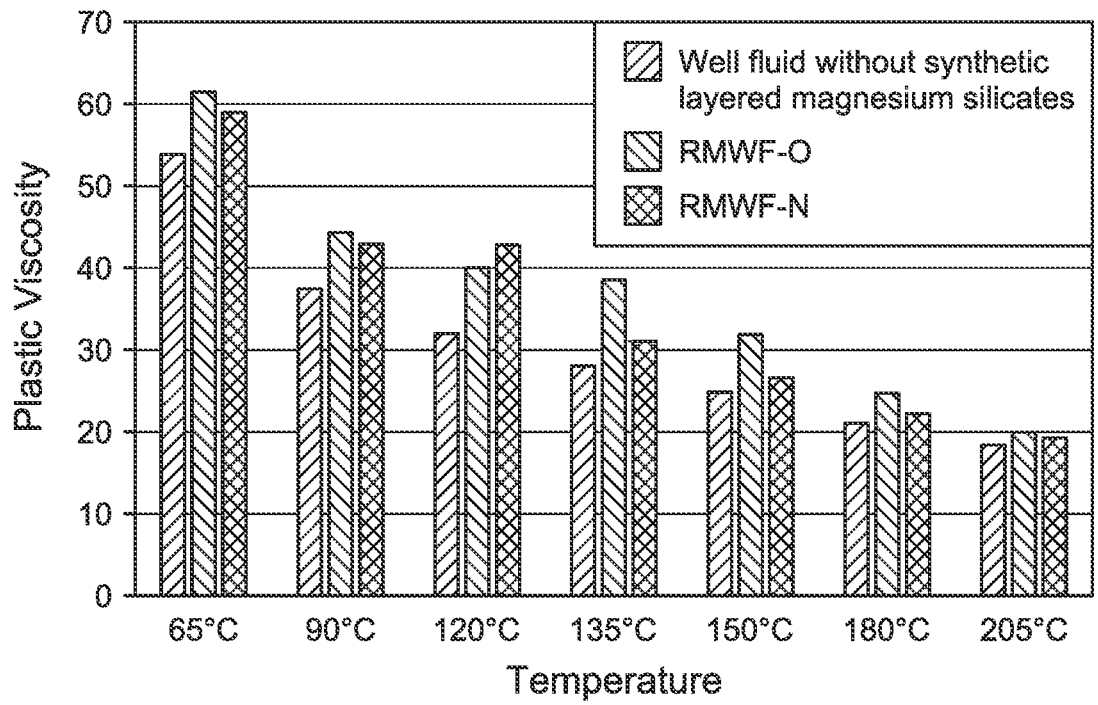
FIG. 5 is a chart showing plastic viscosity of three example well fluids at various temperatures.
Figure 6:
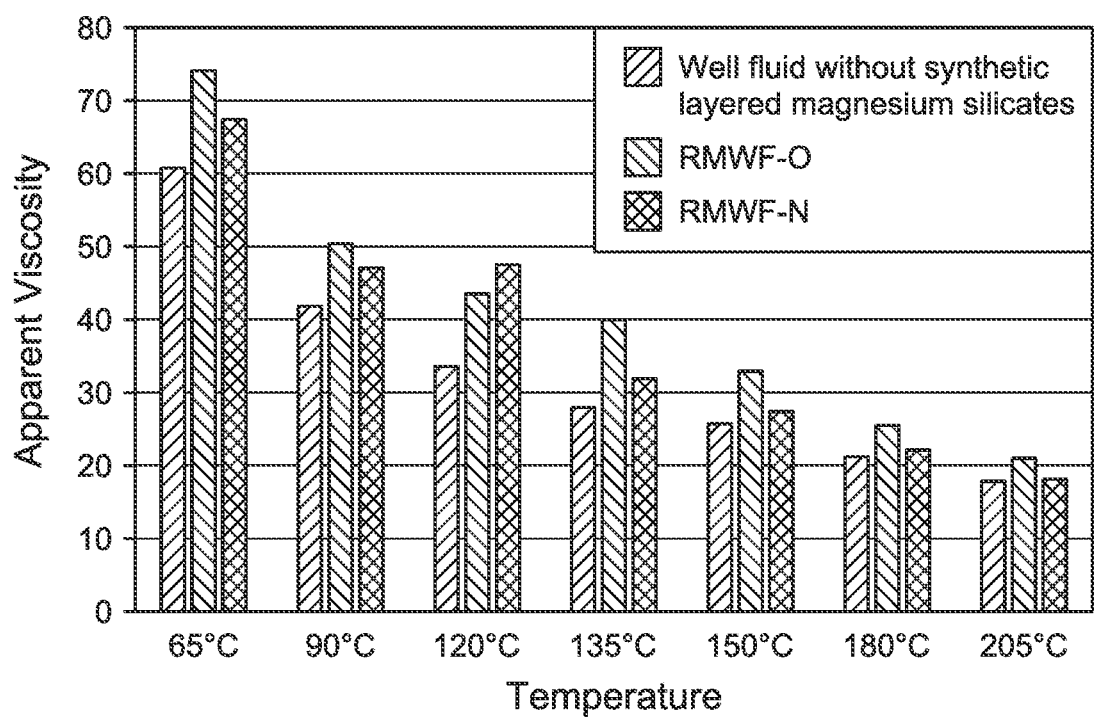
FIG. 6 is a chart showing the apparent viscosity of three example well fluids at various temperatures.

Rheological properties of the aged well fluid without synthetic layered magnesium silicates, the aged RMWF-O of Example 5, and the aged RMWF-N of Example 7 were measured with a rheometer at elevated temperature and pressure conditions to simulate downhole conditions; that is, pressure of about 68,900 kPa and temperatures ranging from about 66-205° C. Each of the samples was aged by hot rolling the sample at a temperature of about 150° C. and a pressure of about 3,500 kPa. FIGS. 5 and 6 show the plastic viscosity and apparent viscosity respectively of each well fluid at various temperatures. As shown in the figures, the plastic viscosity of the RMWF-O and RMWF-N is substantially similar to the plastic viscosity of the well fluid without synthetic layered magnesium silicates throughout the temperature range; suggesting that the rheologically modified well fluids are not likely to negatively affect the rate of penetration.

Figure 7:
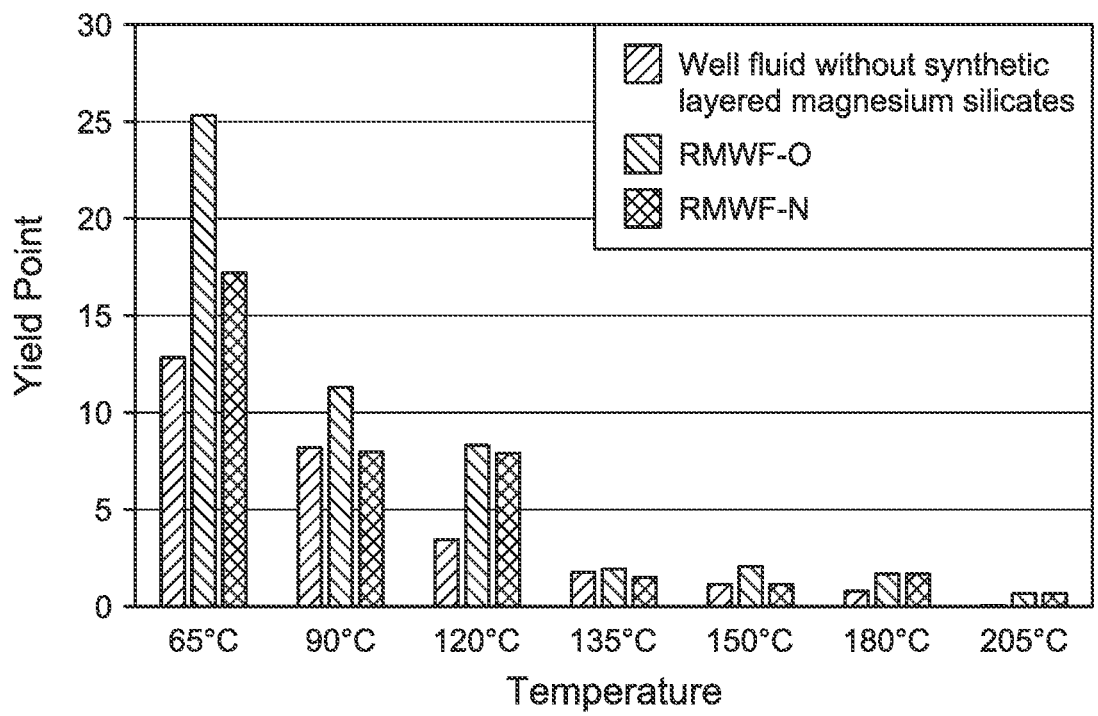
FIG. 7 is a chart showing the yield point of three example well fluids at various temperatures.
Figure 8:
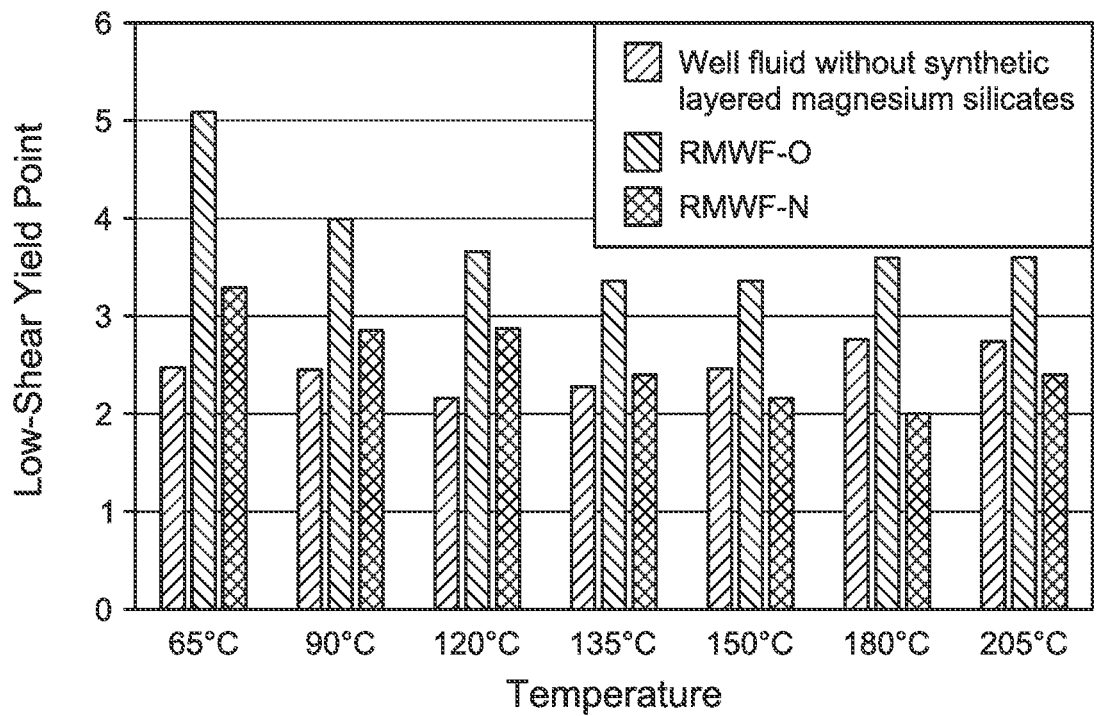
FIG. 8 is a chart showing the low-shear yield point of three example well fluids at various temperatures.

FIGS. 7 and 8 show the yield point and low shear yield point respectively of each well fluid at various temperatures. As shown in the figures, the yield points of the RMWF-O and RMWF-N are generally greater than the yield point of the well fluid without synthetic layered magnesium silicates throughout the temperature range, indicating an improved ability to carry cuttings and other high-density particles.

Example 14

Figure 9:
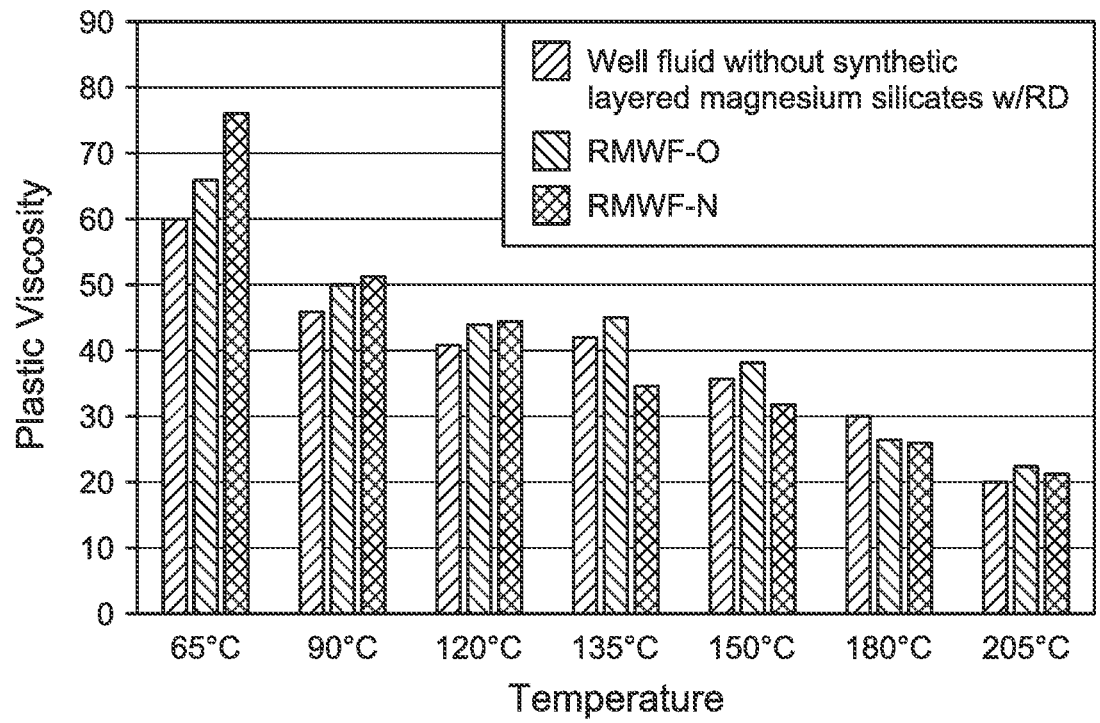
FIG. 9 is a chart showing plastic viscosity of three example well fluids with calcium montmorillonite at various temperatures.
Figure 10:
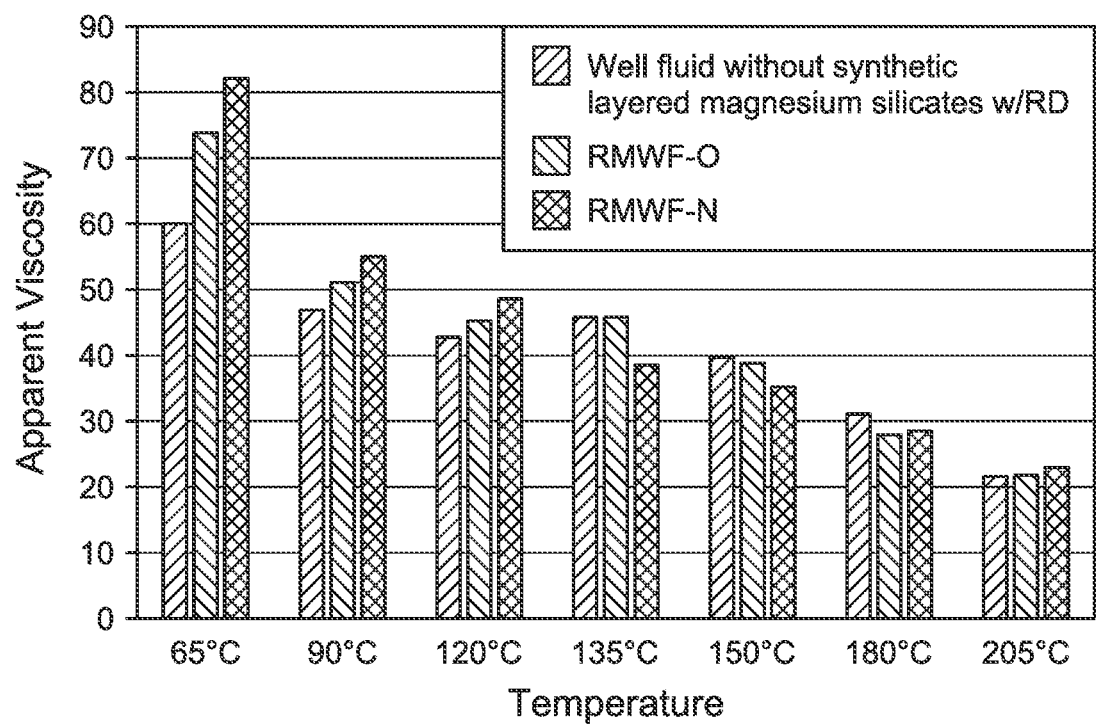
FIG. 10 is a chart showing plastic viscosity of three example well fluids with calcium montmorillonite at various temperatures.

Rheological properties of the aged well fluid without synthetic layered magnesium silicates with calcium montmorillonite, aged RMWF-O of Example 5, and aged RMWF-N of Example 7 were measured with a rheometer at elevated temperature and pressure conditions to simulate downhole conditions (that is, pressure of about 68,900 kPa and temperatures ranging from about 66-205° C.) to model contamination as it occurs during normal drilling operations. Each of the samples was aged by hot rolling the sample at a temperature of about 150° C. and a pressure of about 3,500 kPa. FIGS. 9 and 10 show the plastic viscosity and apparent viscosity respectively of each well fluid at various temperatures. As shown in the figures, the plastic viscosity of the RMWF-O and RMWF-N is substantially similar to the plastic viscosity of the well fluid without synthetic layered magnesium silicates throughout the temperature range and unaffected by the presence of calcium montmorillonite; suggesting that the rheologically modified well fluids are not likely to negatively affect the rate of penetration.

Figure 11:
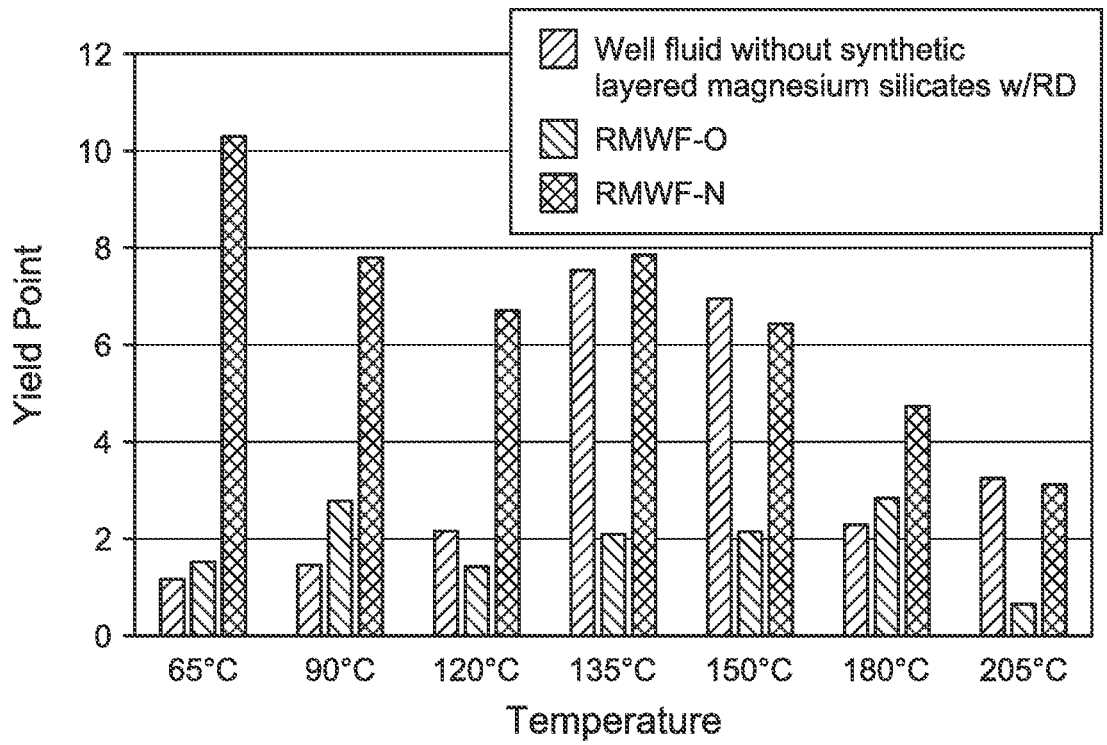
FIG. 11 is a chart showing plastic viscosity of three example well fluids with calcium montmorillonite at various temperatures.
Figure 12:
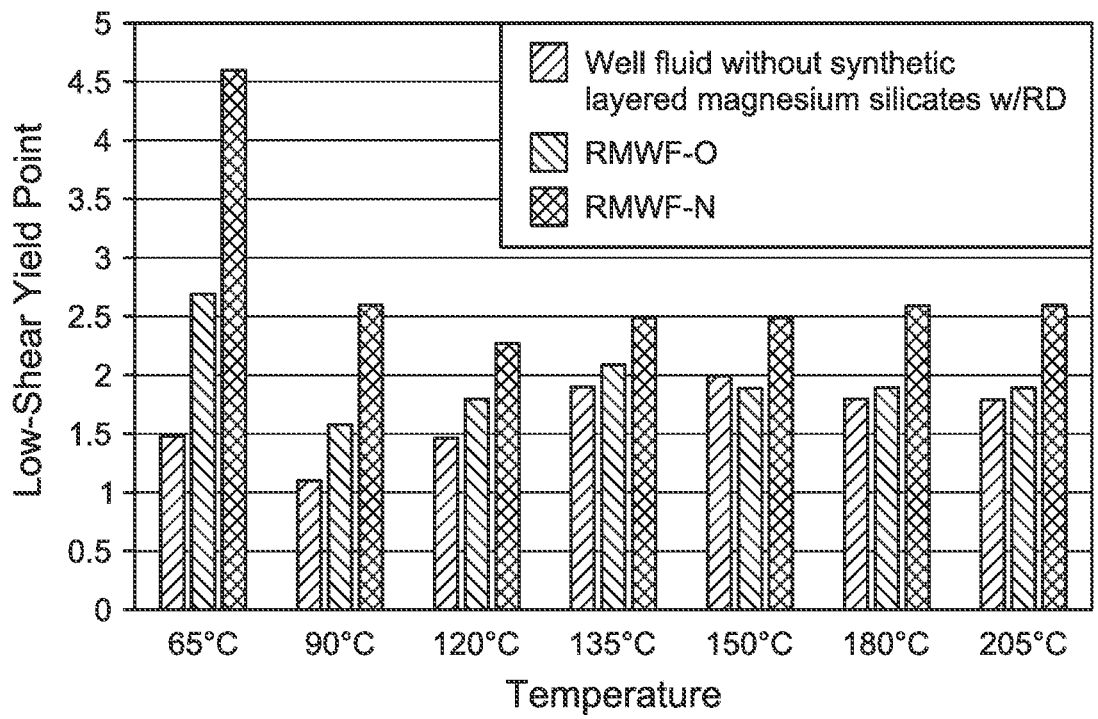
FIG. 12 is a chart showing plastic viscosity of three example well fluids with calcium montmorillonite at various temperatures.

FIGS. 11 and 12 show the yield point and low shear yield point respectively of each well fluid at various temperatures.

As shown in the figures, the yield point of the RMWF-N is significantly greater than the yield point of the well fluid without synthetic layered magnesium silicates throughout the temperature range, indicating an improved ability to carry cuttings and other high-density particles even in the presence of calcium montmorillonite.

Example 15

Drilling fluid, including drilling mud, design and associated properties play a significant role in success of completion of oil wells and maximizing efficiency of drilling operations. A demand for high-density, solids-free drilling fluids has increased in recent years, owing to challenging drilling conditions, including horizontal drilling, greater depths of drilling, and slim-hole drilling.

Saturated solutions of brines are known to have high density, and can present as a clear fluid. The use of such high-density fluids reduces the amount of solid high-density particles, e.g. barite, to be incorporated into the drilling fluids. However, the viscosity of these high-density fluids needs to be enhanced to suspend solid particles and cuttings produced during drilling operations. Typical polymers employed for viscosifying brine-based fluids are a family of biopolymers and their modified counterparts. These polymers include carboxymethyl cellulose, hydroxyethyl cellulose, guar gum, and hydroxypropyl guar, for example. Although a small amount of these polymers generate high viscosity in brine-based drilling fluids, these drilling fluids tend to lose their viscosity at about 150° F. or greater. To overcome the thinning of certain drilling fluids at high temperatures, above about 200° F. or about 325° F., a viscosifier including charged polymers can be used, where the association of a polycation with an anionic surfactant results in an increase in the viscosity in a high temperature window (about 200° F. to about 325° F.). A need exists to improve the viscosity of drilling fluids beyond this temperature window because of extreme temperature and pressure conditions in certain hydrocarbon-bearing reservoirs and associated wells, such as for example in unconventional reservoirs, where temperatures can exceed about 325° F.

Described as follows are unique brine-based, aqueous mud formulations, for example without an oil-based component such as diesel oil, which demonstrate that surprisingly and unexpectedly the presence of a polycation and anionic surfactant does not necessarily achieve lower plastic viscosity (PV), higher yield point (YP), or no settling of solid, high-density materials like barite or magnesium oxide at increased temperatures and pressures.

Instead, surprisingly and unexpectedly, laboratory data presented below demonstrates the formulations for "Mud-C" and "Mud-D" with either 4 or 6 pounds per barrel synthetic layered magnesium silicate and without a polycation and anionic surfactant have lower PV, higher YP, and no solid settling issues to cause drilling mud layer separation at high temperatures. Without synthetic layered magnesium silicate, either with or without a polycation and anionic surfactant, the drilling mud formulations (A, B, and E) exhibit undesirable particle settling issues and separation into visible layers. The presence of a polycation and anionic surfactant can help create a higher value for PV and YP in the formulations, but does not address the settling issues.

TABLE 11

Aqueous, brine-based drilling compositions comparing effects of polycation composition, anionic surfactant composition, and synthetic layered magnesium silicate.

| Drilling Mud Component/Test/ Property | Mud A | Mud B | Mud C | Mud D | Mud E |
|---|---|---|---|---|---|
| NaBr Brine (lbs.) | 409 | 409 | 409 | 409 | 409 |
| Xanthan Gum (lbs.) | 0.5 | 0.5 | 0.5 | 0.5 | 0.5 |
| Fluid Loss Control – HT (lbs.) | 4 | 4 | 4 | 4 | 4 |
| Cationic PHPA (lbs.) | 3 | 3 | 0 | 0 | 0 |
| Sodium dodecylbenzene sulfonate (lbs.) | 3 | 3 | 0 | 0 | 0 |
| Fluid Loss Control Additive LT (lbs.) | 1.5 | 1.5 | 0 | 0 | 0 |
| Synthetic Layered Magnesium Silicate (lbs.) | 0 | 4 | 4 | 6 | 0 |
| Barite (lbs.) | 138 | 138 | 138 | 138 | 138 |
| Micromax ® (lbs.) | 138 | 138 | 138 | 138 | 138 |
| MgO (lbs.) | 2 | 2 | 2 | 2 | 2 |
| Iron Gluconate (lbs.) | 1 | 1 | 1 | 1 | 1 |
| RevDust (lbs.) | 30 | 30 | 30 | 30 | 30 |
| pH Adjustment | 10 | 10 | 10 | 10 | 10 |
| Hot Roll at 275° F. | 16 hours | 16 hours | 16 hours | 16 hours | 16 hours |
| Static Ageing at 275° F. | Strong settling | Mild Settling | No Settling | No Settling | Strong Settling |

For the high temperature (HT) fluid loss control additive, EvoTrol™ HT of Newpark Resources, Inc. located in The Woodlands, TX was applied. This HT fluid loss control additive is a synthetic polymer designed to provide shale inhibition and fluid loss control in high-temperature, water-based drilling fluids. The product can be used in fresh or salt water to control fluid loss, build viscosity, and protect hydratable solids from dispersion. EvoTrol' HT filtration control agent is non-fermenting, soluble, and is effective in water-based fluids. EvoTrol' HT can be used for high-temperature fluid loss control and shale inhibition, and is thermally stable to 475° F. (246° C.

For the low temperature (LT) fluid loss control additive, FL-18 supplied by Fritz Industries of Houston, TX was applied, and FL-18 is a polymeric fluid loss additive for water-based muds. Micromax® is manganese oxide based high density material that is used to increase the density of the mud, and it is supplied by Elkem, headquartered in Norway. Micromax® has a density of 4.8 sg, and is 15% denser and over 60% harder than barite. Due to its sphericity and particle size, the abrasiveness and friction are significantly lower than barite. Micromax® can be used in a wide range of applications, including aqueous and non-aqueous drilling and completion fluids. RevDust is a Ca-montmorillonite clay for drilling muds. pH adjustment was carried out by aqueous sodium hydroxide solution or aqueous hydrochloric acid solution. The pH of the formulations was kept at about 10.

For the drilling mud formulations of Table 11, the muds were prepared as follows: First, if applied, synthetic layered magnesium silicate was mixed in the NaBr brine for about 5 minutes at about 12,000 rpm. Sodium bromide brine generally has a density between about 8.4 to 12.5 lbs./gal and can be used with formation waters with high concentrations of bicarbonate and sulfate ions. The density can be modified by mixing with other brines, if needed. Next, if applied, cationic PHPA (polycation) was added and mixed into the brine for about 5 minutes at about 12,000 rpm. Next, if applied, sodium dodecylbenzene sulfonate (anionic surfactant) was added to the brine and mixed for about 5 minutes at about 12,000 rpm.

Afterward, the HT fluid loss control additive was added to the brine and mixed for about 5 minutes at 12,000 rpm. Next, the MgO was added and mixed into the brine for about 5 minutes at 12,000 rpm. Then, the iron gluconate was added and mixed into the brine for about 5 minutes at 12,000 rpm. Finally, the barite was added and mixed with the brine for about 10 minutes at 12,000 rpm. The additional components of Table 11 are standard drilling mud components added as needed to control base pH, viscosity, and/or density. For example, high density materials like barite and magnesium oxide can be added as needed to increase density of the drilling mud formulations.

Once mud formulations A through E were prepared, the formulations were tested by hot rolling the muds in a nitrogen pressurized cell at 500 psig and 275° F. for 16 hours. Afterward, the cell was cooled down to 120° F., depressurized, and rheology characteristics were measured using a Fann 35 viscometer device.

TABLE 12

Aqueous, brine-based drilling compositions' rheological properties after hot rolling.

|  | Mud A | Mud B | Mud C | Mud D | Mud E |
| --- | --- | --- | --- | --- | --- |
| 600 rpm | 185 | 257 | 141 | 135 | 60 |
| 300 rpm | 108 | 168 | 92 | 89 | 34 |
| 200 rpm | 79 | 130 | 71 | 69 | 24 |
| 100 rpm | 45 | 84 | 46 | 45 | 14 |
| 6 rpm | 6 | 18 | 8 | 8 | 1 |
| 3 rpm | 4 | 12 | 6 | 6 | 0 |
| 10 sec | 5 | 14 | 6 | 7 | 1 |
| 10 min | 7 | 29 | 17 | 18 | 1 |
| Plastic Viscosity | 77 | 89 | 49 | 46 | 26 |
| Yield Point | 31 | 79 | 43 | 43 | 8 |

After hot rolling, static aging of the fluids was conducted for 24 hours, keeping the fluids in a glass jar inside an ageing cell at 275° F. Observation of any settling and segregation was conducted visually as described for FIGS. 13A-13E.

Figures 13, 13A, 13B, 13C, 13D, 13E:
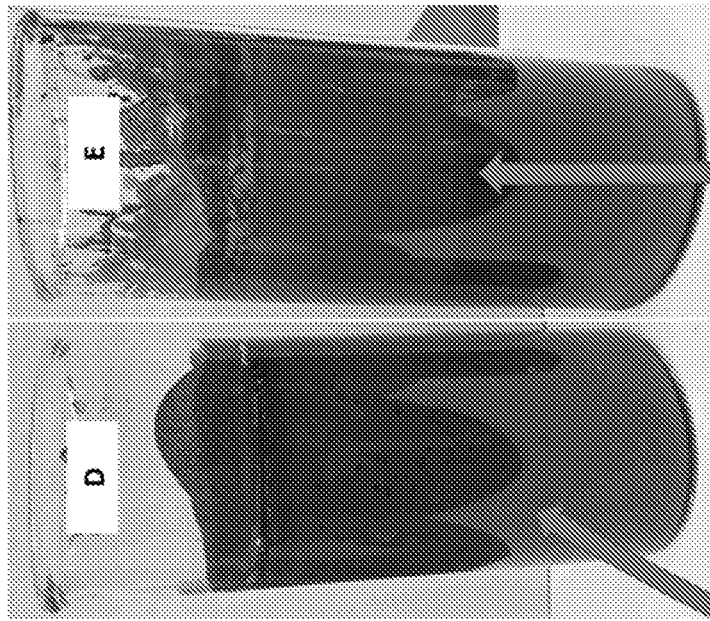
FIG. 13A is a pictorial representation of an aqueous drilling mud formulation showing strong settling issues and separation of layers.
FIG. 13B is a pictorial representation of an aqueous drilling mud formulation showing settling issues and separation of layers less than that in FIG. 13A.
FIG. 13C is a pictorial representation of an aqueous drilling mud formulation showing no issues with settling or separation of layers, as opposed to FIGS. 13A and 13B.
FIG. 13D is a pictorial representation of an aqueous drilling mud formulation showing no issues with settling or separation of layers, as opposed to FIGS. 13A and 13B.
FIG. 13E is a pictorial representation of an aqueous drilling mud formulation showing settling issues and separation of layers, similar to that in FIG. 13A.

FIG. 13A is a pictorial representation of an aqueous drilling mud formulation showing strong settling issues and separation of layers.

FIG. 13B is a pictorial representation of an aqueous drilling mud formulation showing settling issues and separation of layers less than that in FIG. 13A.

FIG. 13C is a pictorial representation of an aqueous drilling mud formulation showing no issues with settling or separation of layers, as opposed to FIGS. 13A and 13B.

FIG. 13D is a pictorial representation of an aqueous drilling mud formulation showing no issues with settling or separation of layers, as opposed to FIGS. 13A and 13B.

FIG. 13E is a pictorial representation of an aqueous drilling mud formulation showing settling issues and separation of layers, similar to that in FIG. 13A.

In some embodiments of the presently described aqueous drilling fluid (for example, a drilling mud) formulations, xanthan gum, in addition to or alternative to other biopolymer viscosifiers, can be added at between about 0.05 to about 2 lbs./bbl. to a base brine. A cationic polymer, such as for example cationic PHPA, can be added to a base brine at between about 0.1 to about 5 lbs/bbl. An anionic surfactant, such as for example sodium dodecylbenzene sulfonate, can be added at about 0.1 to about 5 lbs./bbl. to a base brine. A low temperature (LT) fluid loss control additive can be added to a base brine at between about 0.1 to about 5 lbs./bbl. A high temperature (HT) fluid loss control additive can be added to a base brine at between about 0.1 to about 7 lbs./bbl.

Synthetic layered magnesium silicate as a suspension additive can be added to a base brine at between about 0.1 to about 10 lbs./bbl. Magnesium oxide, in addition to or alternative to other densifiers, can be added at between about 0.1 to about 5 lbs./bbl. Iron gluconate can be added at between about 0.1 to about 5 lbs./bbl. of a base brine. The final aqueous drilling fluid (drilling mud) formulation can have a density between about 8 to about 22 lbs./gal., and in some embodiments no hydrocarbon solvents such as diesel oil are needed in the formulations. In some embodiments, one or more components is not utilized where desirable suspension, density, and viscosity characteristics are achieved after heating to 275° F.

In some embodiments of the present disclosure, synthetic layered magnesium silicates for use in aqueous drilling mud formulations do not include hydrophobic organic functional groups such as, for example, phenyl groups or hexadecyl groups, because these functional groups are not easily dispersible or hydrophilic in water or brine-based drilling fluids such as an aqueous drilling mud. In certain prior art, phyllosilicates that are obtained naturally from mines are used in drilling fluids. These phyllosilicates generally exhibit particular surface charges (e.g. negatively charged surfaces). Viscoelastic surfactants can also be used to form physical linkages (hydrostatic, ionic, or electrostatic) with negatively charges phyllosilicates. This interaction can generate viscosity in aqueous fluids. However, in embodiments of the present disclosure, layered magnesium silicates do not effect suspension or viscosifying effects through surface charges. Instead, covalently linked hydrophilic functionality for suspension is effected through Si—C bonds. In embodiments of the present disclosure, surfactants are not applied or used to enhance rheological properties in the drilling fluids. The synthetic layered approach of the present disclosure facilitates generation of the desired functionality on the surface of nanoplatelets, for example increasing suspendability or viscosification in drilling fluids.

In the present disclosure, the term "about" can include values between +5% and −5% of a recited value or range of values.

We claim:

1. A method of making a modified well fluid, the method comprising:

combining an amount of a synthetic functionalized additive with an intermediate well fluid composition to form a synthetic functionalized additive-containing well fluid composition; the synthetic functionalized additive comprising a synthetic layered magnesium silicate that is covalently bonded to a functional group, and the intermediate well fluid composition comprising a water-based continuous phase with solid particles, wherein the synthetic functionalized additive increases suspension stability of the solid particles versus a well fluid composition comprising the solid particles without the synthetic functionalized additive, wherein the intermediate well fluid composition comprises a sodium bromide brine, and comprises a biopolymeric viscosifier at between about 0.05 to about 2 lbs./bbl. of the brine; a fluid loss control additive at between about 0.1 to about 7 lbs./bbl. of the brine; a polycation at between about 0.1 to about 5 lbs/bbl. of the brine; a anionic surfactant at between about 0.1 to about 5 lbs./bbl. of the brine; a solid densifier at between about 0.1 to about 10 lbs./bbl of the brine; a pH additive; and the synthetic functionalized additive at between about 0.1 to about 10 lbs./bbl. of the brine, and wherein the modified well fluid has a density between about 8 to about 22 lbs./gal.

2. The method of claim 1, wherein the functional group that is covalently bonded to the synthetic layered magnesium silicate is selected from the group consisting of hydroxyl groups (—OH), amine groups, and combinations of the same.

3. The method of claim 1, wherein the intermediate well fluid composition further comprises a polycation component and an anionic surfactant component.

4. The method of claim 3, wherein the polycation component comprises partially hydrolyzed polyacrylamide.

5. The method of claim 3, wherein the anionic surfactant component comprises an alkylbenzene sulfonate.

6. The method of claim 5, wherein the anionic surfactant component comprises sodium dodecylbenzene sulfonate.

7. The method of claim 1, wherein the synthetic functionalized additive increases suspension stability of the solid particles versus the well fluid composition comprising the solid particles without the synthetic functionalized additive after hot rolling the modified well fluid at about at least 275° F. and about 500 psig for about at least 16 hours.

8. The method of claim 1, wherein the modified well fluid composition does not have hydrocarbon components such as hydrocarbon solvents added.

9. The method of claim 1, wherein the synthetic functionalized additive is not functionalized by hydrophobic functional groups.

10. A modified well fluid composition, the composition comprising:
a water-based fluid with solid particles in suspension; and
a synthetic layered magnesium silicate, the synthetic layered magnesium silicate comprising:
a first functionalized silicate layer, the first functionalized silicate layer comprising a tetrahedral silicate layer and a functional group,
an octahedral brucite layer, the octahedral brucite layer comprising magnesium oxide/hydroxide, and
a second functionalized silicate layer, the second functionalized silicate layer comprising the tetrahedral silicate layer and the functional group,
wherein the octahedral brucite layer is positioned between the first functionalized silicate layer and the second functionalized silicate layer, and wherein the functional group extends from both the first functionalized silicate layer and the second functionalized silicate layer away from the octahedral brucite layer.

11. The composition of claim 10, wherein the functional group is selected from the group consisting of hydroxyl groups (—OH), amine groups, and combinations of the same.

12. The composition of claim 10, wherein the modified well fluid composition further comprises a cationic component and an anionic surfactant component.

13. The composition of claim 12, wherein the cationic component comprises partially hydrolyzed polyacrylamide.

14. The composition of claim 12, wherein the anionic surfactant component comprises an alkylbenzene sulfonate.

15. The composition of claim 14, wherein the alkylbenzene sulfonate comprises a compound selected from the group consisting of: sodium dodecylbenzene sulfonate, dodecyl sulfonate, and combination of the same.

16. The composition of claim 10, wherein the modified well fluid composition further comprises a biopolymer selected from the group consisting of carboxymethyl cellulose, hydroxyethyl cellulose, guar gum, hydroxypropyl guar, xanthan gum, and combinations of the same.

17. The composition of claim 10, wherein the water-based fluid comprises at least one component selected from the group consisting of: brine; a biopolymeric viscosifier; a fluid loss control additive; a polycation; an anionic surfactant; a solid densifier; and a pH adjustment additive.

18. The composition of claim 17, wherein the water-based fluid comprises a sodium bromide brine, and comprises the biopolymeric viscosifier at between about 0.05 to about 2 lbs./bbl. of the brine; the fluid loss control additive at between about 0.1 to about 7 lbs./bbl. of the brine; the polycation at between about 0.1 to about 5 lbs/bbl. of the brine; the anionic surfactant at between about 0.1 to about 5 lbs./bbl. of the brine; the solid densifier at between about 0.1 to about 10 lbs./bbl of the brine; and the synthetic layered magnesium silicate at between about 0.1 to about 10 lbs./bbl. of the brine, wherein the modified well fluid composition has a density between about 8 to about 22 lbs./gal.

19. The composition of claim 10, wherein the synthetic layered magnesium silicate increases suspension stability of the solid particles versus the well fluid composition comprising the solid particles without the synthetic functionalized additive after hot rolling the modified well fluid at about at least 275° F. and about 500 psig for about at least 16 hours.

20. The composition of claim 10, wherein the modified well fluid composition does not have hydrocarbon components such as hydrocarbon solvents added.

21. The composition of claim 10, wherein the synthetic layered magnesium silicate does not exhibit hydrophobic functional groups.

22. A method of drilling a well in a subterranean formation, the method comprising:
supplying the modified well fluid composition of claim 10 to a drill string; and
operating the drill string such that the modified well fluid composition is conducted to a bottom hole assembly having a drill bit, and such that the drill bit drills into the subterranean formation.

23. A method of making a modified well fluid, the method comprising:
combining an amount of a synthetic functionalized additive with an intermediate well fluid composition to form a synthetic functionalized additive-containing well fluid composition;
the intermediate well fluid composition comprising a water-based continuous phase with solid particles, wherein the synthetic functionalized additive increases suspension stability of the solid particles versus a well fluid composition comprising the solid particles without the synthetic functionalized additive, and the synthetic functionalized additive comprising a synthetic layered magnesium silicate, the synthetic layered magnesium silicate comprising:
a first functionalized silicate layer, the first functionalized silicate layer comprising a tetrahedral silicate layer and a functional group,
an octahedral brucite layer, the octahedral brucite layer comprising magnesium oxide/hydroxide, and
a second functionalized silicate layer, the second functionalized silicate layer comprising the tetrahedral silicate layer and the functional group, wherein the octahedral brucite layer is positioned between the first functionalized silicate layer and the second functionalized silicate layer, and wherein the functional group extends from both the first functionalized silicate layer and the second functionalized silicate layer away from the octahedral brucite layer.

* * * * *